US007784039B2

(12) United States Patent
Tanaka

(10) Patent No.: US 7,784,039 B2
(45) Date of Patent: Aug. 24, 2010

(54) COMPILER, COMPILATION METHOD, AND COMPILATION PROGRAM

(75) Inventor: Akira Tanaka, Hirakata (JP)

(73) Assignee: Panasonic Corporation, Osaka (JP)

( * ) Notice: Subject to any disclaimer, the term of this patent is extended or adjusted under 35 U.S.C. 154(b) by 1345 days.

(21) Appl. No.: 11/229,731

(22) Filed: Sep. 20, 2005

(65) Prior Publication Data

US 2006/0064682 A1 Mar. 23, 2006

(30) Foreign Application Priority Data

Sep. 22, 2004 (JP) ............................. 2004-275573

(51) Int. Cl.
*G06F 9/45* (2006.01)
(52) U.S. Cl. ...................... 717/151; 717/140
(58) Field of Classification Search ........................ None
See application file for complete search history.

(56) References Cited

U.S. PATENT DOCUMENTS

| 6,035,122 | A  | * | 3/2000 | Ando ......................... 717/155 |
| 6,170,083 | B1 | * | 1/2001 | Adl-Tabatabai ............. 717/158 |
| 6,463,582 | B1 | * | 10/2002 | Lethin et al. ................ 717/158 |
| 6,681,387 | B1 |   | 1/2004 | Hwu et al. |
| 2002/0066080 | A1 |   | 5/2002 | O'Dowd |
| 2003/0233643 | A1 | * | 12/2003 | Thompson et al. .......... 717/161 |

OTHER PUBLICATIONS

Fisher et al.; "Trace Scheduling: A Technique for Global Microcode Compaction"; *IEEE Transactions on Computers*; c. 1981; pp. 478-490; vol. C-30, No. 7.
Hwu et al.; "The Superblock: An Effective Technique for VLIW and Superscalar Compilation"; *The Journal of Supercomputing*; No. 7; pp. 229-248; c. 1993.
A.V. Aho et al., "Compilers: Principles, Techniques, and Tools, Chapter 10—Code Optimization," Addison Wesley (1986).
Ikuo Nakata, Konpaira no Kosei to Saitekika (Compiler Configuration & Optimization), Asakura Shuppan (2004), pp. 358-381.

* cited by examiner

*Primary Examiner*—Wei Y Zhen
*Assistant Examiner*—Lanny Ung
(74) *Attorney, Agent, or Firm*—McDermott Will & Emery LLP

(57) ABSTRACT

A compile converts a program having a multiple execution paths so as to expand a basic block on a specific execution path while maintaining the program integrity. The complier generates new basic blocks B103 and B104. The basic block B104 is composed of (i) statements generated by replacing replacement target variables in a partial source program (basic blocks B1-B7) on a hot path 200, and (ii) a branch instruction that includes a branch condition for executing the hot path, generated by modifying a branch instruction on the hot path 200. The basic block B103 is composed of statements for restoring restoration target variables out of the replacement target variables. The source program is then converted to execute, subsequently to the basic block B104, the basic block B103 if the branch instruction in the basic block B103 is true, and to execute the basic block B1 if false.

18 Claims, 15 Drawing Sheets

```
   .....
   a = b + c;              /* S1 */
   c = a + 10;             /* S2 */
   If (c > 0){             /* S3 */
      c = c + 1;           /* S4 */
      d = e + 1;           /* S5 */
   }else{
      a = c + 2;           /* S6 */
      d = d + 2;           /* S7 */
   }
   f = d + 3;              /* S8 */
   If (f > 0){             /* S9 */
      a = b + 10;          /* S10 */
      x = y + 20;          /* S11 */
   }else{
      b = a + 10;          /* S12 */
      x = y + 30;          /* S13 */
      g = c + b;           /* S14 */
   }
   f = f + g;              /* S15 */
   .....
```

FIG.10A

| BLOCK | IN | DEF | OUT |
|---|---|---|---|
| B1 | b,c,d,e,g,z,w,y | a,c | a,b,c,d,e,g,z,w,y |
| B2 | a,b,c,e,g,z,w,y | c,d | a,b,c,d,e,g,z,w,y |
| B3 | b,c,d,e,g,z,w,y | a,d | a,b,c,d,e,g,z,w,y |
| B4 | a,b,c,d,e,g,z,w,y | f | a,b,c,e,f,g,z,w,y |
| B5 | b,c,e,f,g,z,w,y | a,x | a,c,e,f,g,z,w,x,y |
| B6 | a,c,e,f,z,w,y | b,x,g | a,c,e,f,g,z,w,x,y |
| B7 | a,c,e,f,g,z,x,y | f | a,c,e,f,z,w,x,y |

FIG.10B

| | |
|---|---|
| PATH-ENTRY VARIABLE | b,c,d,e,g,z,w,y |
| PATH-EXIT VARIABLE | a,c,e,f,z,w,x,y |
| REPLACEMENT TARGET VARIABLE | c,d |
| RESTORATION TARGET VARIABLE | c |

FIG.10C

| BLOCK | VARIABLE PAIR GENERATION HISTORY |
|---|---|
| B12 | (c,t1) |
| B22 | (c,t2) (d,t3) |
| B42 | (c,t2) (d,t3) |
| B52 | (c,t2) (d,t3) |
| B72 | (c,t2) (d,t3) |

COMPILER, COMPILATION METHOD, AND COMPILATION PROGRAM

This application is based on an application No. 2004-275573 filed in Japan, the content of which is hereby incorporated by reference.

BACKGROUND OF THE INVENTION (1) Field of the Invention

The present invention relates to compilers, and more specifically to an optimizing compilation technique for improving execution speeds.

(2) Description of the Related Art

Conventionally, in order to improve the performance of programs installed in a computer system that processes massive data, an optimizing compiler is used to optimize such a program to shorten the program execution time.

One optimization method is instruction scheduling that reorders program statements to improve the execution efficiency.

Upon the optimization, a compiler analyzes the control flow of a program focusing on branches and branch targets to divide the program into units called basic blocks. A basic block is a sequence of consecutive statements containing no branches and merges, and thus executed from the beginning to the end in order. Yet, each basic block may contain a branch at the end.

Since basic blocks contain no branches and merges in a middle, instruction scheduling within each basic block is readily carried out. It should be noted, however, that the local optimization within basic blocks produces only a limited effect. For this reason, it is desirable to expand basic blocks, so that instruction scheduling takes place within a wider range of the program.

Regarding a program containing multiple branches, it may be known that which of the execution paths is frequently executed (such an execution path is hereinafter referred to as a "hot path"). According to one known method, statements on a hot path are moved so as to expand a basic block to increase the execution efficiency of the hot path (See "Compiler Configuration & Optimization" by Ikuo NAKATA, Published by Asakura Shuppan in 2004, pp. 358-381).

Here, a description is given to how to expand a basic block residing on a hot path, taking a program shown in FIG. 5A as an example. FIG. 5A shows part of the program, whereas FIG. 5B shows a control flow graph, which is a representation of the control flow, of the program. In the graph, edges connecting basic blocks B1-B7 represent branches and merges. In this example, an execution path represented by a dashed allow 200 that sequentially connects the basic blocks B1, B2, B4, B5 and B7 is a hot path.

As shown in FIG. 6, a statement S8 included in the basic block B4 is moved into the basic block B2. Next, for a path branched from the basic block B3 to the basic block B4, a statement S81 is generated by duplicating the statement S8 and inserted into the basic block B3 (FIG. 7). With this arrangement, the basic block B2 residing on the hot path is expanded while maintaining the program integrity.

However, there is a problem in a case shown in FIG. 8 where a statement S10 is moved from the basic block B5 to the basic block B2. Suppose, an execution path is taken sequentially from the basic blocks B1, B2, and B4, and a branch condition of a statement S9 in the basic block B4 is false. In this case, a variable "a" referenced by a statement S12 in the basic block B6 must hold a value defined by a statement S1 in the basic block B1. However, the variable "a" holds a value defined by the statement S10 having been moved into the basic block B2. As a result, the program integrity is no longer maintained.

As described above, there may be a case where data dependency present in a program may not be ensured if a statement is moved across a basic block of which last statement is a branch instruction. In such a case, reordering of the statements is restricted and thus the basic blocks cannot be expanded.

SUMMARY OF THE INVENTION

The present invention is made in view of the above problems and aims to provide a compiler for allowing a basic block on a specific execution path to be expended, while maintaining the program integrity.

According to one aspect of the present invention, there is provided a compiler for converting a source program including a branch instruction into an object program composed of lines of object code. The compiler includes: an execution path specifying unit operable to specify one of a plurality of execution paths of a partial series of instructions, including a branch instruction, of the source program; an execution-path code generating unit operable to generate execution-path code that at least includes object code corresponding to instructions residing on the specified execution path except the branch instruction, the code generation involving replacing, with another variable, each variable that needs to be alive at an entry point of the specified execution path and is defined on the specified execution path; a restoration code generating unit operable to generate restoration code for restoring each of the replaced variables that needs to be alive at an exit point of the specified execution path to an original variable; a partial code generating unit operable to generate partial code corresponding to the partial series of instructions; and a branch code generating unit operable to generate branch code based on a branch condition of the branch instruction residing on the specified execution path. The branch code leads from an end of the execution-path code to a beginning of the restoration code if the branch condition is true, and causes a branch from the end of the execution-path code to a beginning of the partial code if the branch condition is false.

Note that the end of the execution-path code is lead to the beginning of the restoration code as a result of sequential execution of the code or as a result of a branch.

With the structure stated above, a basic block residing on the specified execution path is expanded. Consequently, instruction scheduling can take place within a wider range of code, so that optimization is performed more effectively. With the structure stated above, in addition, the statements on the specified execution path are executed with a higher priority and include no branch instructions. Consequently, the execution speed of the execution-path code improves, especially when the specified execution path is taken highly frequently than other paths.

As described above, the compiler according to the present invention is capable of converting a program including a multiple execution paths, in a manner to increase the execution speed of a frequently executed path. For this advantage, the compiler is highly usable for example by being installed in information processing devices including digital home appliances.

Here, the execution-path code generating unit may be further operable to place the execution-path code at a position immediately after a series of instructions immediately preceding a beginning of the partial series of instructions. The restoration code generating unit may be further operable to place the restoration code at a position immediately after the end of the execution-path code and to place, at a position immediately after the restoration code, a series of instructions immediately following an end of the partial series of instructions. The branch code generating unit may be further operable to generate branch code that causes a branch from an end of the partial code to the series of instruction immediately following the end of the partial series of instructions.

With the structure stated above, the newly generated execution-path code is placed so as continuously follow the source program excluding the partial series of instructions. Thus, when executing the source program, the cache memory is effectively allocated. In addition, since there is no branch between the execution-path code and the source program, the execution speed of the overall program improves, especially when the specified execution path is taken highly frequently.

Here, the compiler may convert the source program into intermediate code based on a syntactic analysis, and convert the intermediate code into the object program. The execution-path code generating unit may include: a variable information deriving subunit operable to derive a target variable to be replaced, from variables included in partial intermediate code that is converted from the partial series of instructions based on the syntactic analysis; an execution-path intermediate code generating subunit operable to generate execution-path intermediate code at least including intermediate code that is included in the partial intermediate code and corresponds to the instructions residing on the specified execution path except the branch instruction, by replacing each target variable included in the intermediate code with another variable; and a judgment intermediate code generating subunit operable to convert all branch condition included in the execution-path intermediate code into a single branch condition for taking the specified execution path and to generate judgment intermediate code for making a judgment on the branch condition. The restoration code generating unit may include a restoration intermediate code generating subunit operable to generate restoration intermediate code for restoring each replaced variable that needs to be alive at the exit point of the specified execution path to an original variable. The branch code generating unit may include: a branch intermediate code generating subunit operable to generate branch intermediate code that causes a branch to a beginning of the partial intermediate code if the branch condition in the judgment intermediate code is false; and an executable code generating subunit operable to convert the partial intermediate code, the execution-path intermediate code, the judgment intermediate code, the restoration intermediate code, and the branch intermediate code to executable code that constitutes the object program.

With the structure stated above, the source program is first converted into an intermediate program, which is easier for the compiler to process, so that an executable program is generated effectively. In addition, since the intermediate program contains a single branch instruction generated by combining a plurality of branch instructions, optimization of the intermediate program is effectively carried out.

Here, the compiler may convert the source program into intermediate code based on a syntactic analysis, and converts the intermediate code into the object program. The execution-path code generating unit may include: a variable information deriving subunit operable to derive a target variable to be replaced, from variables included in partial intermediate code that is converted from the partial series of instructions based on the syntactic analysis; an execution-path intermediate code generating subunit operable to generate execution-path intermediate code at least including intermediate code that is included in the partial intermediate code and corresponds to the instructions residing on the specified execution path except the branch instruction, by replacing each target variable included in the intermediate code with another variable; and a judgment intermediate code generating subunit operable to separately convert each branch condition included in the execution-path intermediate code into an individual branch condition for taking the specified execution path and to generate separate sets of judgment intermediate code each for making a judgment on a respective one of the branch conditions. The restoration code generating unit may include a restoration intermediate code generating subunit operable to generate restoration intermediate code for restoring each replaced variable that needs to be alive at the exit point of the specified execution path to an original variable. The branch code generating unit may include: a branch intermediate code generating subunit operable to separately generate sets of branch intermediate code each for causing a branch to a beginning of the partial intermediate code if the branch condition in the respective one of the sets of judgment intermediate code is false and leading toward a beginning of the restoration intermediate code if the branch condition is true; and an executable code generating subunit operable to convert the partial intermediate code, the execution-path intermediate code, the judgment intermediate code, the restoration intermediate code, and the branch intermediate code to executable code that constitutes the object program.

With the structure stated above, the judgment intermediate code generating subunit separately converts each branch condition included in the execution-path code into an individual branch condition for taking the specified execution path and generates separate sets of branch intermediate code each for making a judgment on an individual one of the branch conditions. Consequently, in the case, for example, where the specified execution path is not so frequently taken, a branch to another execution path is taken at an earlier stage of program execution.

Here, the compiler may have an interpreter function for sequentially executing the source program. The compiler may further include an extracting unit operable to extract a frequently executed path by collecting information on execution paths taken during execution of the partial series of instructions using the interpreter function. The execution path specifying unit may specify the execution path extracted by the extracting unit.

With the structure stated above, an execution path that is frequently taken is specified based on information obtained through actual execution of the program. Consequently, it is allowed to expand a basic block residing on the thus specified frequently-executed path.

Here, the compiler may optimize object code generated by the partial code generating unit, the execution-path code generating unit, the restoration code generating unit, and the branch code generating unit.

With the structure stated above, the thus generated object program is optimized to further improve the execution speed.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIGS. 10A, 10B, and 10C are views showing the data structure and example contents of variable information computed by the variable information computing unit 121, and of the history of variable pairs generated by the execution-path intermediate code generating unit 122;

DESCRIPTION OF THE PREFERRED EMBODIMENT

Embodiment

According to one embodiment of the present invention, a compiler (i) reads a source program, (ii) performs a lexical analysis that is a process of breaking the source program into a sequence of symbols called "lexical tokens", (iii) performs a syntactic analysis that is a process of building a syntactic tree structure based on the lexical tokens, (iv) generates, based on the syntactic tree structure, an intermediate program written in a specific intermediate language used by the compiler, (v) optimizes the intermediate program by, for example, instruction scheduling and allocates resources, such as registers, to variables, and (vi) converts the optimized intermediate program to an executable program.

Structure

Figure 1:
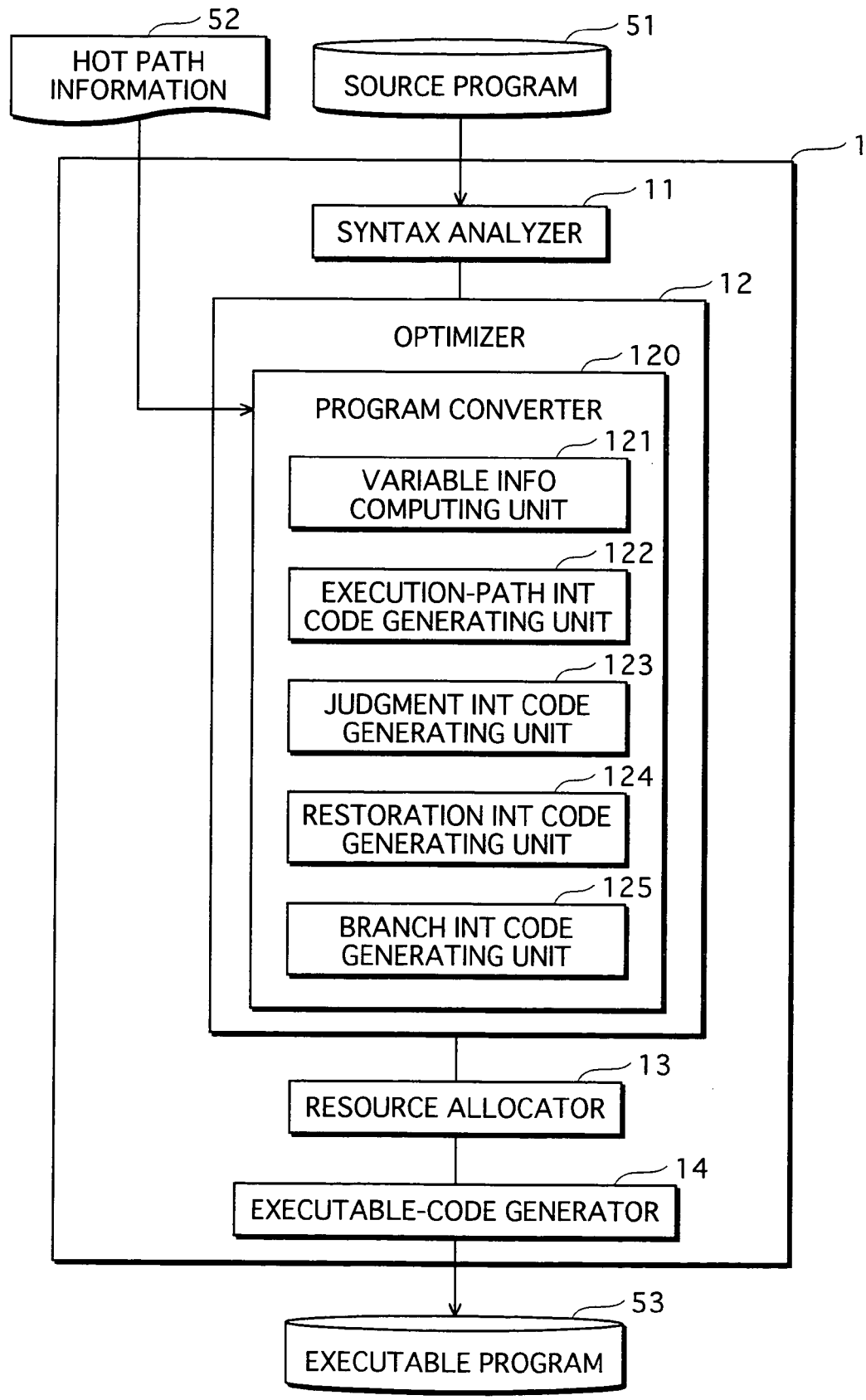
FIG. 1 is a functional block diagram of a compiler according to an embodiment of the present invention.

FIG. 1 is a functional block diagram showing an overall structure of a compiler 1 according to the embodiment.

The compiler 1 is composed of such functional blocks as a syntax analyzer 11, an optimizer 12, a resource allocator 13, and an executable-code generator 14. Note that in the figures, the word "intermediated" is abbreviated as "int".

Specifically, the compiler 1 is implemented by a computer system generally composed of a microprocessor, Read Only Memory (ROM), Random Access Memory (RAM), and a hard disk. The ROM or hard disk stores a computer program.

The functional blocks of the compiler 1 shown in FIG. 1 are implemented by the microprocessor executing the computer program. In addition, the RAM and hard disk are used to realize storage of information by the functional blocks and transfer of information between the functional blocks.

Hereinafter, a description is given to each functional block.

The syntax analyzer 11 reads a source program 51, performs a syntactic analysis to recognize the control structure of the source program 51, generates an intermediate program composed of lines of intermediate code, and stores the intermediate program within the compiler 1. The intermediate code is a representation of the source program having an equivalent control structure and generated using conditional branch instructions and labels.

The optimizer 12 includes a program converter 120. The optimizer 12 performs a control flow analysis and a dataflow analysis on the intermediate program generated by the syntax analyzer 11, and sends the analytical results to the program converter 120, which will be described later in detail. In addition, the optimizer 12 carries out optimization at the time when the program converter 120 converts the intermediate code to executable code.

The control flow analysis mentioned herein is a process of analyzing the control flow of the intermediate program in order to break the intermediate program into basic blocks. On the other hand, the dataflow analysis is a process of determining, for each variable occurs in the program, a section within which the variable is alive, variable definition points, and variable reference points.

Note that the terms "definition" of a variable and "reference" to a variable are used herein in the following meaning. When a statement updates the value held by a variable, it is said that the statement defines the variable, and the statement is called a variable definition point. When a statement uses the value held by a variable, it is said that the statement refers to the variable, and the statement is called a variable reference point.

Next, a description is given to the program converter 120.

The program converter 120 is generally composed of a variable information computing unit 121, an execution-path intermediate code generating unit 122, a judgment intermediate code generating unit 123, a restoration intermediate code generating unit 124, and a branch intermediate code generating unit 125.

On receiving hot path information from a source external to the compiler 1, the program converter 120 stores the hot path information therein and performs program conversion of a subroutine that contains a hot path.

The hot path information is input by a user and indicates an execution path determined in advance by the user.

The variable information computing unit 121 computes liveness information and definition information for each basic block, based on the analytical results received from the optimizer 12. Using the liveness information, the definition information, and the hot path information, the variable information computing unit 121 derives path-entry variables, path-exit variables, replacement target variables, and restoration target variables. The thus derived replacement target variables are sent to the execution-path intermediate code generating unit 122, whereas the restoration target variables are sent to the restoration intermediate code generating unit 124.

Liveness information indicates, for each basic block generated according to the control flow analysis, variables that are alive at the entry point of the basic block (hereinafter "liveness information IN") and at the exit point of the basic block ("hereinafter, "liveness information OUT"). More specifically, liveness information IN indicates variables referenced before being defined downstream from the entry point of each basic block, whereas liveness information OUT indicates variables referenced before being defined downstream from the exit point of each basic block. Definition information (hereinafter "definition information DEF") indicates variables defined in each basic block.

A similar description of the liveness of variables is found in "Compilers: Principles, Techniques, and Tools" by A. V. Aho, R. Sethi, and J. D. Ullman, published by Addison Wesley Publishing Company in 1986, and pp. 631-632 of its Japanese version "Compilers I and II" translated by Kenichi Harada, published by SAIENSU-SHA Co., Ltd. in 1990.

Path-entry variables are live variables at the entry point of the hot path, i.e. the variables indicated by liveness information IN of the first basic block on the hot path. Path-exit variables are live variables at the exit point of the hot path, i.e. the variables indicated by liveness information OUT of the last basic block on the hot path.

Replacement target variables are path-entry variables that are defined on the hot path. Restoration target variables are both replacement target variables and path-exit variables.

The execution-path intermediate code generating unit 122 reads the hot path information 52 stored in the program converter 120 and the intermediate program stored in the compiler 1. The execution-path intermediate code generating unit 122 then generates execution-path intermediate code from a series of statements composing part of the read intermediate program corresponding to the hot path, by replacing identifies of replacement target variables sent from the variable information computing unit 121. The thus generated execution-path intermediate code is sent to the judgment intermediate code generating unit 123.

Here, a description is given to the process of replacing the identifiers of replacement target variables.

The execution-path intermediate code generating unit 122 replaces the identifiers of replacement target variables with different identifiers that are not present in a variable table. Each time the variable replacement takes place, the execution-path intermediate code generating unit 122 pairs a replacement target variable with a variable used to replace the replacement target variable (hereinafter, such a pair of pre- and post-replacement variables is referred to as a "variable pair"), and stores the variable pair in the program converter 120. Note that the variable table is generated through the lexical analysis by collecting information about the identifiers and types of all variables declared in the program. The variable table is stored within the compiler 1.

The judgment intermediate code generating unit 123 generates judgment intermediate code that includes a branch condition for executing the hot path, by modifying branch instructions included in the execution-path intermediate code sent from the execution-path intermediate code generating unit 122. The judgment intermediate code generating unit 123 then inserts the judgment intermediate code into the execution-path intermediate code, so that the judgment intermediate code is executed subsequently to the execution-path intermediate code excluding the branch instructions. The resulting execution-path intermediate code is stored within the program converter 120.

The restoration intermediate code generating unit 124 generates, based on the restoration target variables sent from the variable information computing unit 121, restoration intermediate code for restoring the identifiers of restoration target variables back to their original identifiers. The thus generated restoration intermediate code is stored within the program converter 120.

The branch intermediate code generating unit 125 reads from the program converter 120 the judgment intermediate code inserted in the execution-path intermediate code to generate branch intermediate code. The branch intermediate code generated herein causes, subsequently to execution of the execution-path intermediate code, the restoration intermediate code to be executed if the branch condition of the judgment intermediate code is true, and the partial intermediate code to be executed if the branch condition is false. The branch intermediate code generating unit 125 then inserts the branch intermediate code into the execution-path intermediate code, so that the branch intermediate code is executed subsequently to the judgment intermediate code. The resulting execution-path intermediate code is then stored within the program converter 120.

The resource allocator 13 reads the entire intermediate code generated. At the time of generating executable code from the intermediate code, the resource allocator 13 carries out allocation of hardware resources such as registers and memory, based on the liveness information of variables occurring in the entire intermediate code.

After the resource allocation, the executable-code generator 14 converts the entire intermediate code to an executable program 53 written in a suitable machine language. The executable program 53 is then output to the outside of the compiler 1.

Data

Now, a description is given to data used by the compiler 1 of the embodiment.

Figures 5A, 5B:
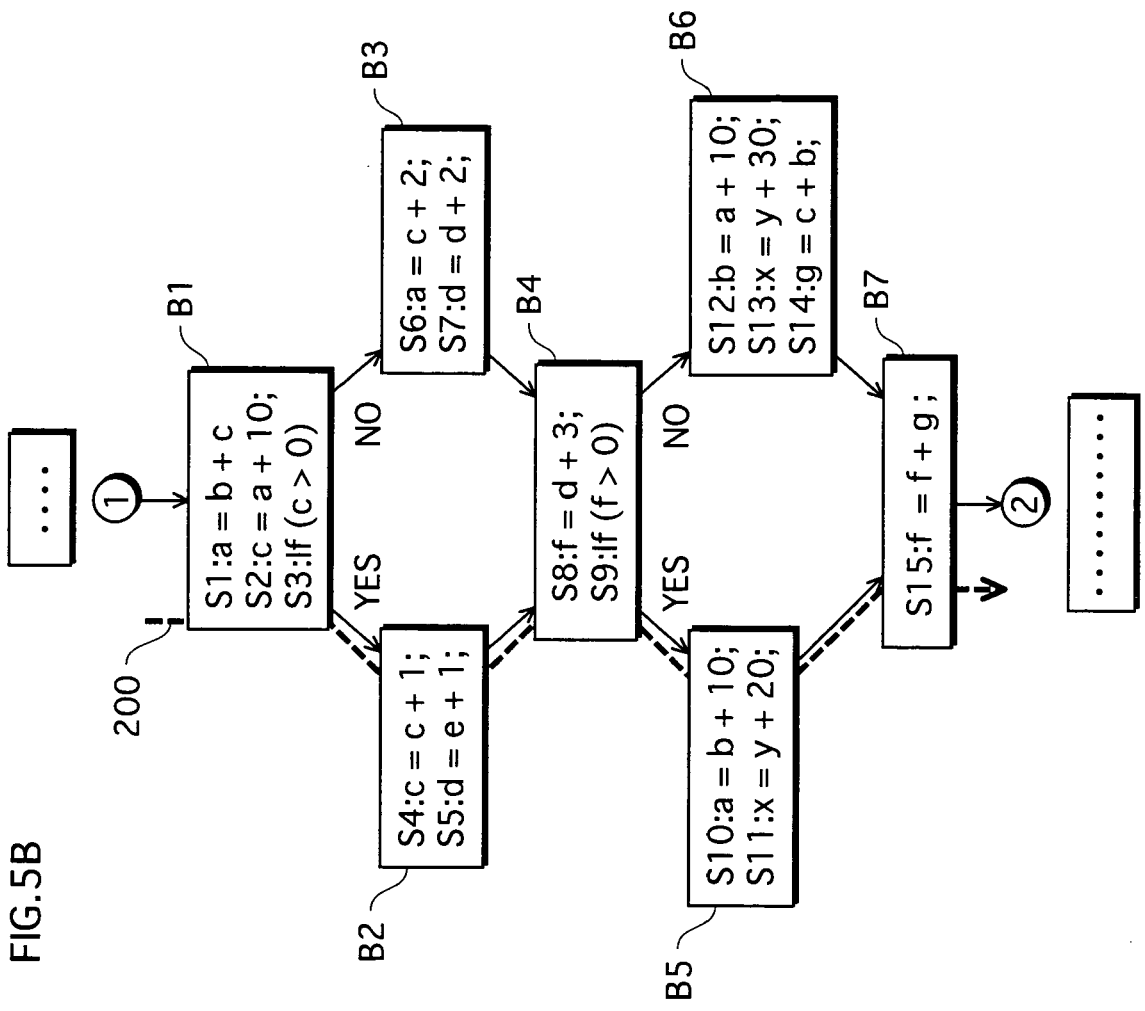
FIGS. 5A and 5B are views for used for explaining the operation of the compiler.
Figure 6:
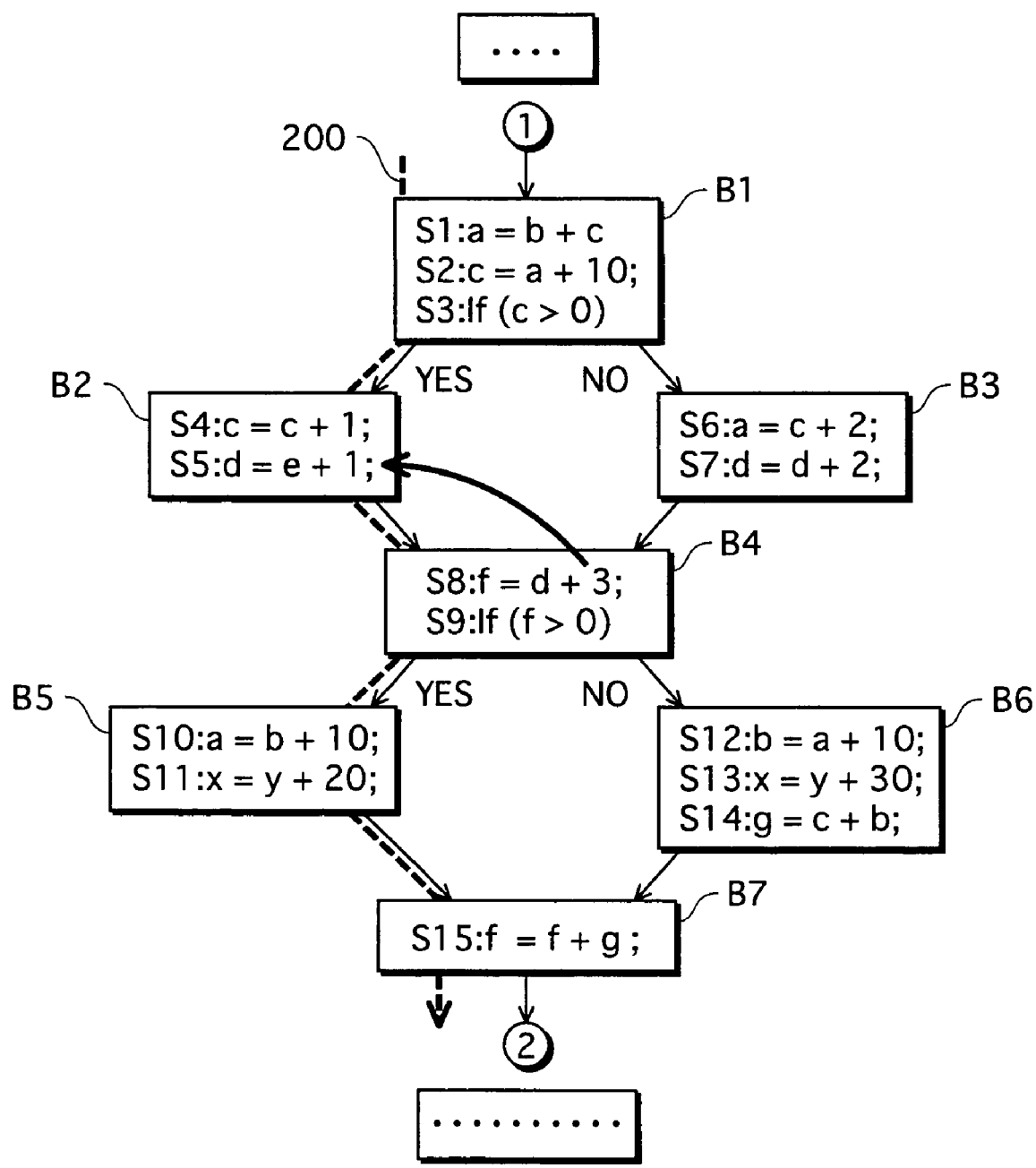
FIG. 6 is a view used for explaining prior art and the problem to be solved by the present invention.
Figure 7:
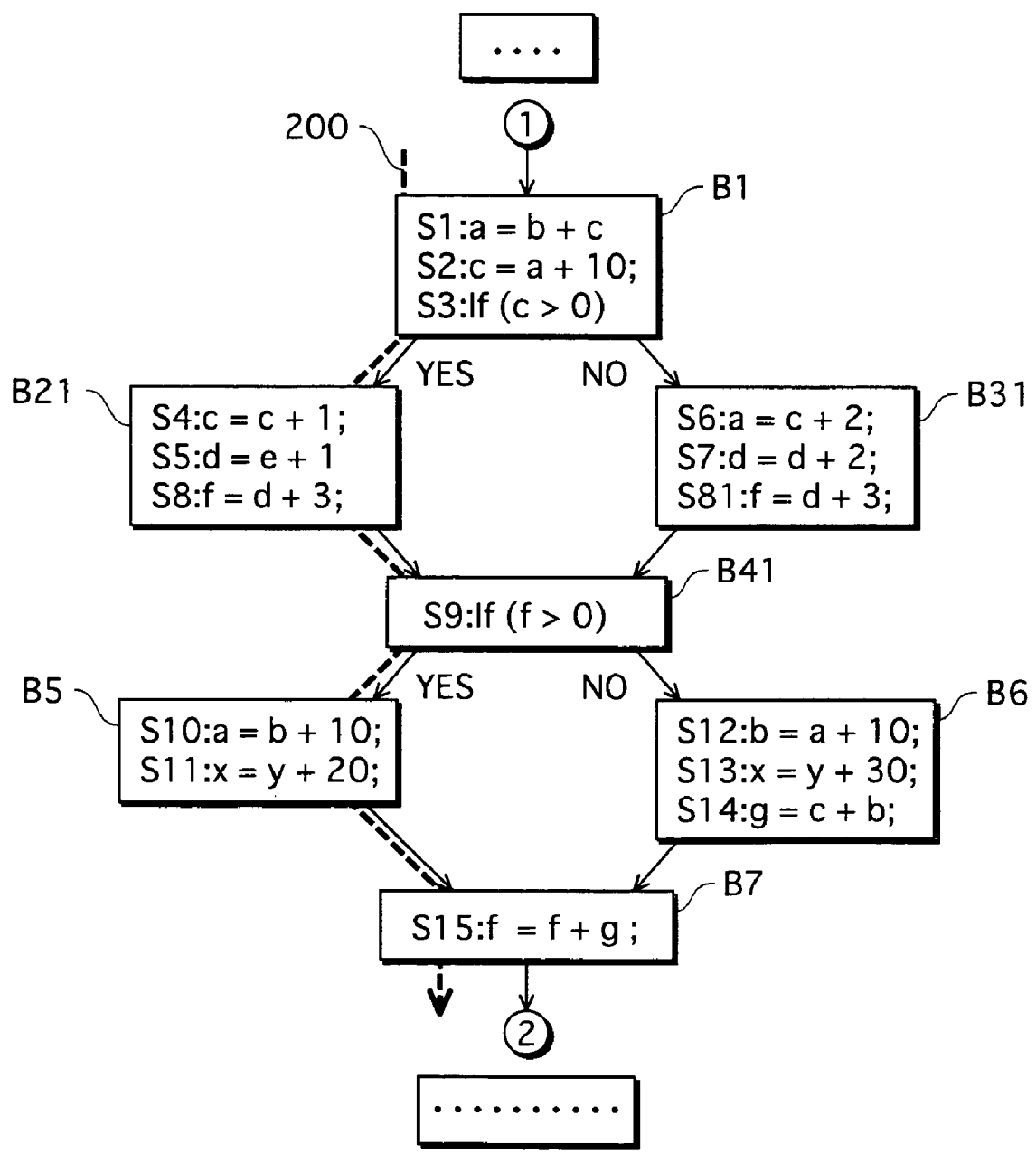
FIG. 7 is a view used for explaining prior art and the problem to be solved by the present invention.
Figure 8:
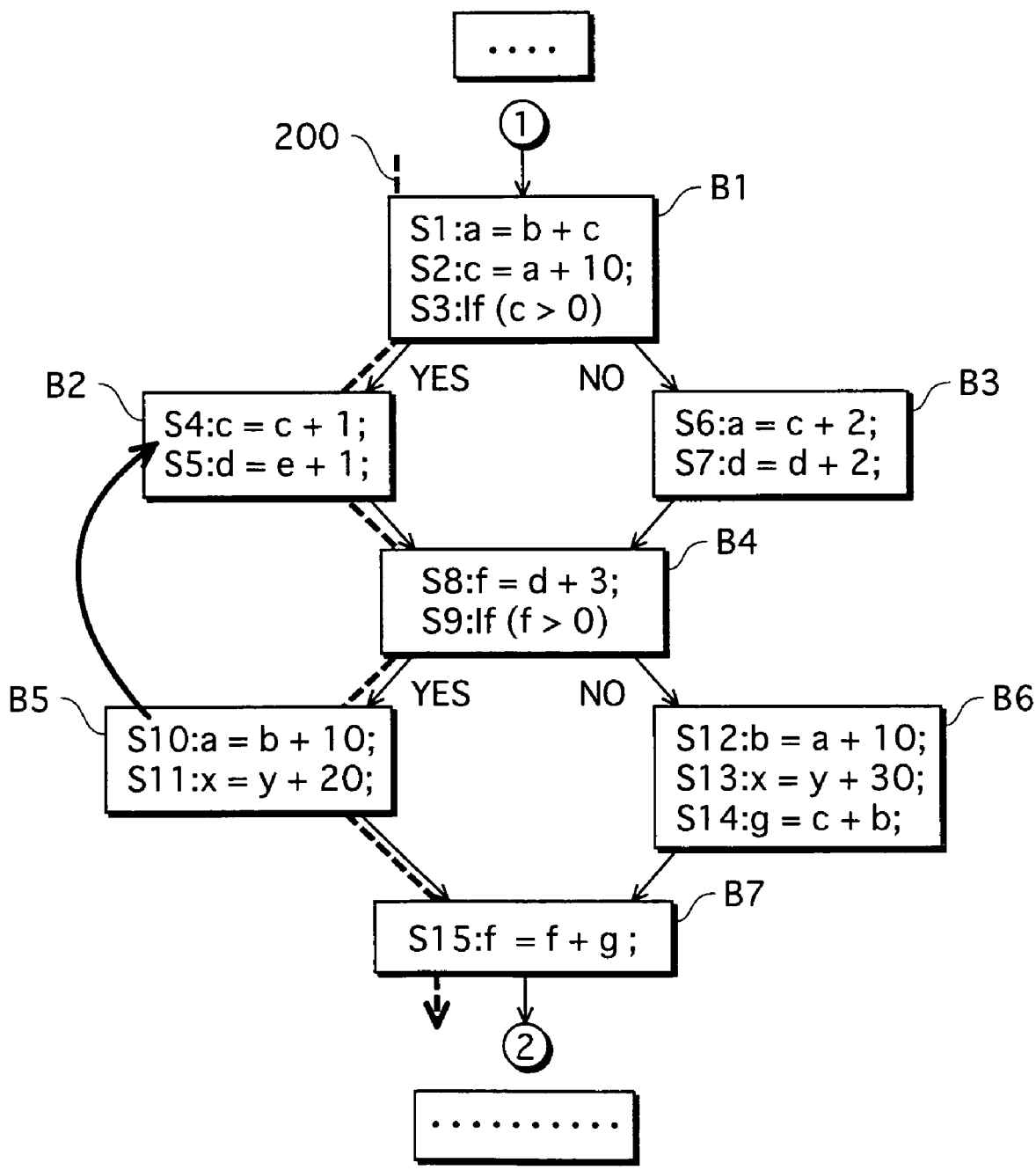
FIG. 8 is a view used for explaining prior art and the problem to be solved by the present invention.

FIG. 10A shows liveness information IN 302, liveness information OUT 304, and definition information DEF 303 computed by the variable information computing unit 121 for each basic block of the control flow graph shown in FIG. 5B.

FIG. 10B shows path-entry variables 401, path-exit variables 402, replacement target variables 403, and restoration target variables 404 derived by the variable information computing unit 121 based on the information shown in FIG. 10A.

Figure 9:
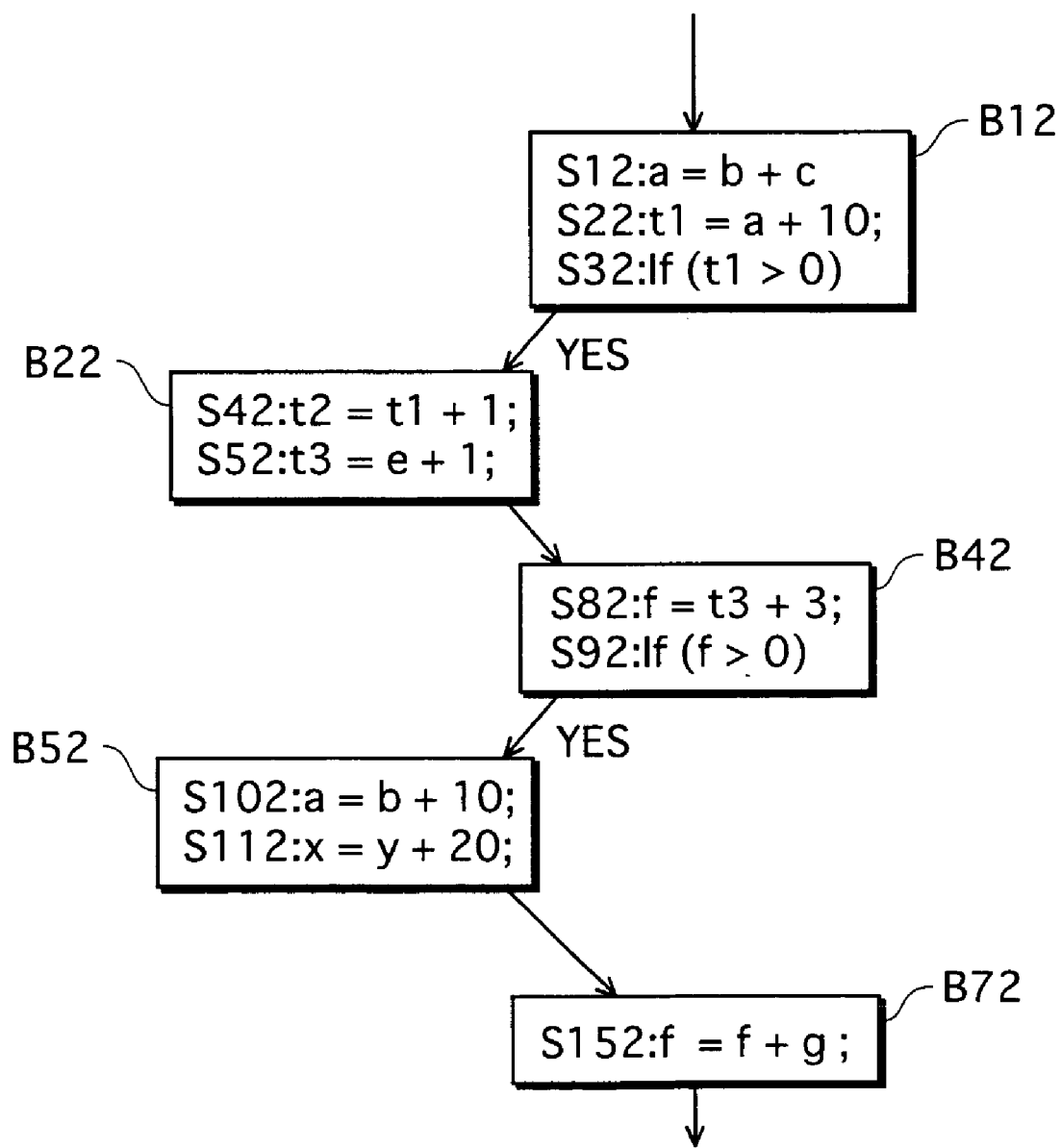
FIG. 9 is a view used for explaining the operation of the compiler.

FIG. 10C shows generation history of variable pairs for each basic block of the control flow graph shown in FIG. 9. As mentioned above, each variable pair is generated by the execution-path intermediate code generating unit 122 when replacing a replacement target variable. The control flow graph shown in FIG. 9 represents the execution path newly generated by the execution-path intermediate code generating unit 122 by duplicating the statements residing on the hot path 200 shown in FIG. 5B and conducting the variable replacement processing on the duplicate statements.

Operation

Figure 2:
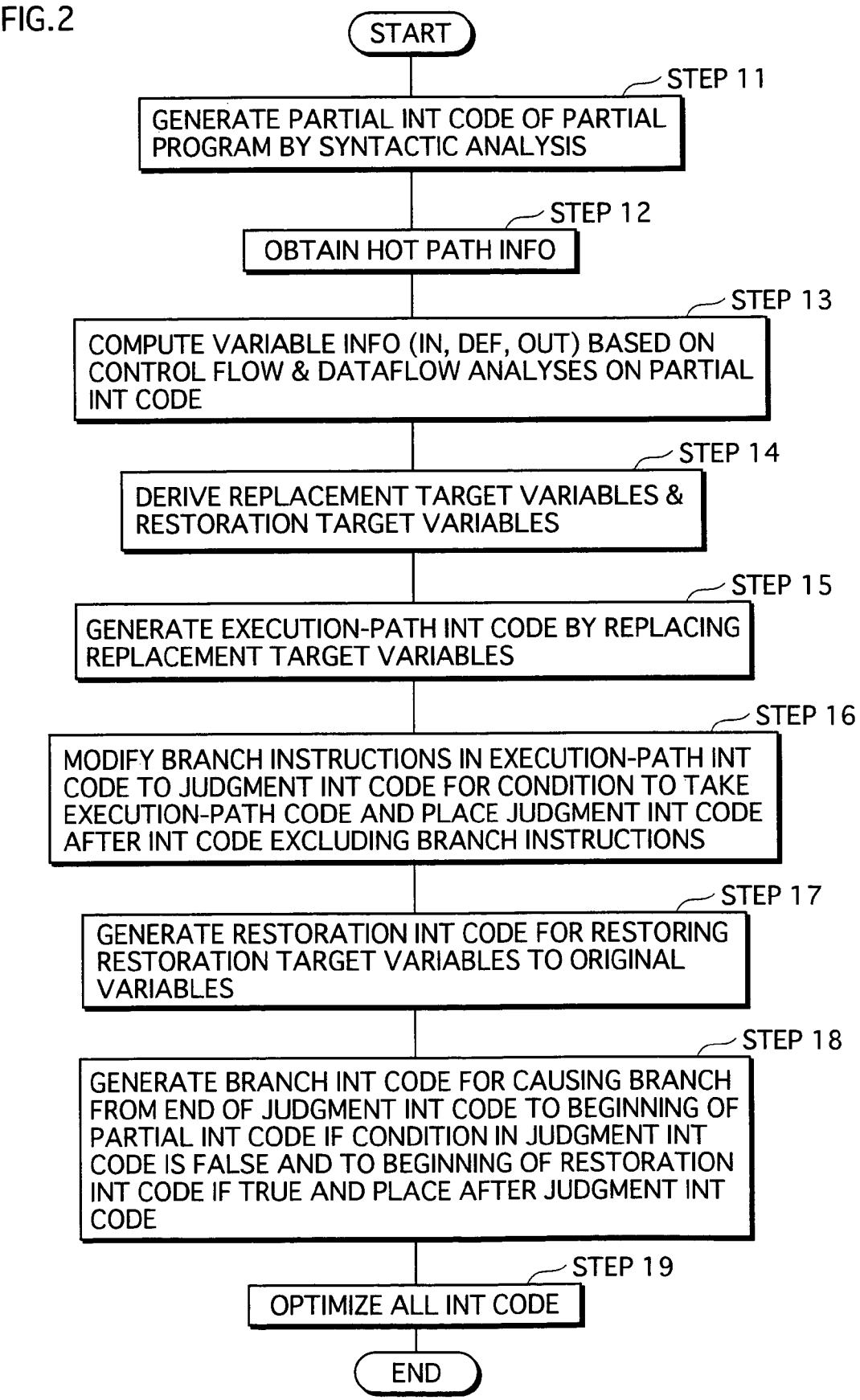
FIG. 2 shows the operation flow of the compiler.

Next, with reference to the operation flow shown in FIG. 2, a description is given mainly to operations of the program converter 120 where a characterizing feature of the present invention lies.

Note that in this embodiment, the program converter 120 processes a subroutine, which is referred to as a partial program. The subroutine includes multiple execution paths sharing a single entry point and a single exit point.

First, the syntax analyzer 11 syntactically analyzes a partial program upon receipt, generates partial intermediate code corresponding to the partial program, and stores the thus generated partial intermediate code within the compiler 1. (Step 11)

Next, at an input of the hot path information 52 (FIG. 1), the program converter 120 stores therein the hot path information. (Step 12) Subsequently to the step 12, the optimizer 12 reads the partial intermediate code, performs a control flow analysis and dataflow analysis to produce and send analytical results to the variable information computing unit 121. Based on the analytical results, the variable information computing unit 121 computes, for each basic block of the partial program, liveness information IN and OUT and definition information DEF. (Step 13)

Next, based on the liveness information IN and OUT and definition information DEF computed in the step 13 as well as the hot path information received in the step 12, the variable information computing unit 121 derives path-entry variables, path-exit variables, replacement target variables, and restoration target variables. The variable information computing unit 121 sends the replacement target variables to the execution-path intermediate code generating unit 122 and the restoration target variables to the restoration intermediate code generating unit 124. (Step 14)

Subsequent to the step 14, the execution-path intermediate code generating unit 122 reads the hot path information and the partial intermediate code, duplicates statements corresponding to the hot path of the partial intermediate code, and modifies the duplicate statements by replacing the identifiers of replacement target variables to generate execution-path intermediate code. The thus generated execution-path intermediate code is sent to the judgment intermediate code generating unit 123. (Step 15)

On receiving the execution-path intermediate code, the judgment intermediate code generating unit 123 generates judgment intermediate code by modifying branch conditions included in the execution-path intermediate code into a branch condition for executing the hot path. The judgment intermediate code generating unit 123 then inserts the judgment intimidate code into the execution-path intermediate code, so that the judgment intermediate code is executed subsequently to the statements of the execution-path intermediate code except the branch instructions. The resulting execution-path intermediate code is stored within the program converter 120. (Step 16)

Next, the restoration intermediate code generating unit 124 generates restoration intermediate code for restoring the restoration target variables received from the variable information computing unit 121, and stores the restoration intermediate code within the program converter 120. (Step 17)

Subsequent to the step 17, the branch intermediate code generating unit 125 reads the execution-path intermediate code stored in the step 16, generates branch intermediate code, and inserts the branch intermediate code into the execution-path intermediate code. The branch intermediate code generated herein causes, subsequently to execution of the judgment intermediate code, the partial intermediate code generated in the step 11 to be executed from the beginning of the partial intermediate code if the branch condition of the judgment intermediate code is not met. If the branch condition is met, the restoration intermediate code generated in the step 17 is caused to be executed subsequently to the judgment intermediate code. (Step 18)

The optimizer 12 reads the partial intermediate code stored in the step 11, the execution-path intermediate code stored in the step 16, and the restoration intermediate code stored in the step 17, and optimizes all the read intermediate code. (Step 19)

Variable Information Computing Processing

Figure 3:
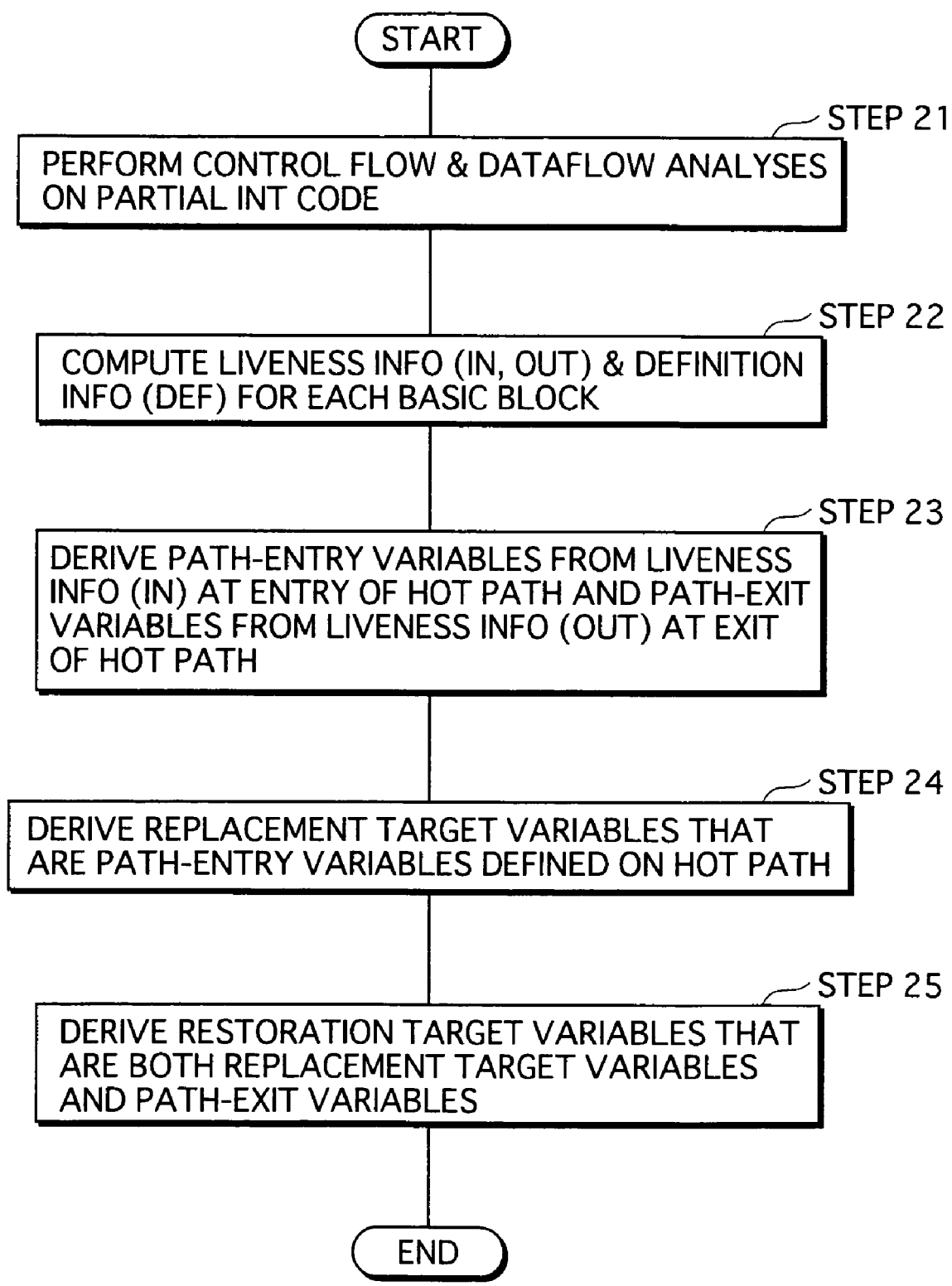
FIG. 3 shows the flow of variable information computing processing performed by a variable information computing unit 121.

Next, a description is given to the variable information computing processing, with reference to FIG. 3.

First, the optimizer 12 performs the control flow and data-flow analyses on the partial program (Step 21). Based on the analytical results, the variable information computing unit 121 computes liveness information IN and OUT and definition information DEF relating to variables occurring in the partial program (Step 22).

Next, the variable information computing unit 121 derives path-entry variables from the liveness information IN computed in the step 22 for the first block on the hot path, and path-exit variables from the liveness information OUT computed in the step 22 for the last block on the hot path (Step 23).

Subsequent to the step 23, the variable information computing unit 121 derives, as replacement target variables, the path-entry variables that are indicated by the definition information DEF relating to the hot path (Step 24).

Next, the variable information computing unit 121 derives, as restoration target variables, variables that are both the replacement target variable derived in the step 24 and the path-exit variables. The variable information computing unit 121 then sends the restoration target variables and the replacement target variables to the execution-path intermediate code generating unit 122 (Step 25).

Variable Replacement Processing

On receiving information indicating the replacement target variables from the variable information computing unit 121, the execution-path intermediate code generating unit 122 reads the partial intermediate code and the hot path information, duplicates statements corresponding to the hot path of the partial intermediate code, repeats the variable replacement processing on each replacement target variable included in the duplicate statements, and generates variable pairs.

Figure 4:
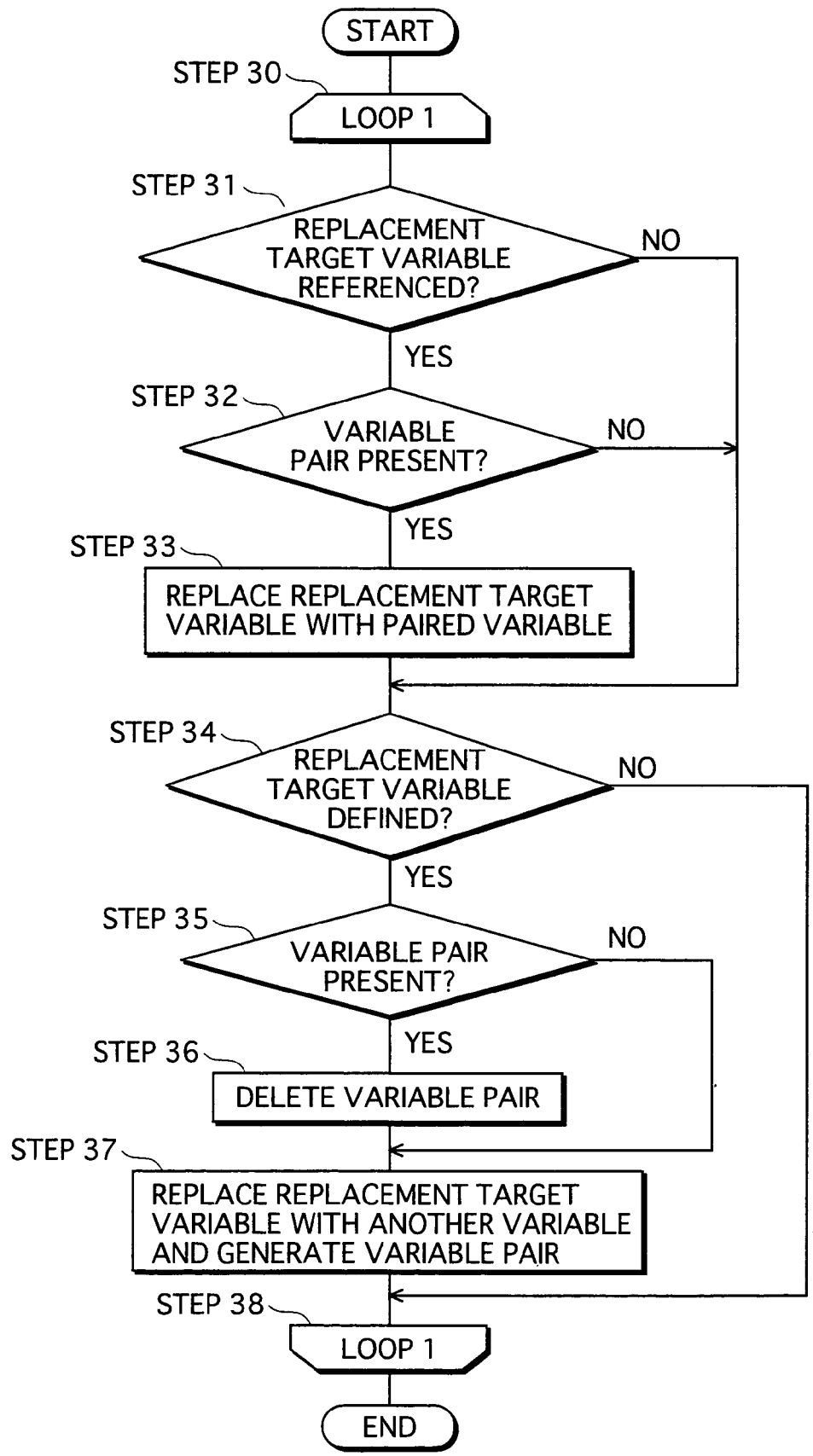
FIG. 4 shows the flow of variable replacement processing performed by an execution-path intermediate code generating unit 122.

Hereinafter, a description is given to the variable replacement processing with reference to FIG. 4.

The execution-path intermediate code generating unit 122 repeats the variable replacement processing for each replacement target variable included in the duplicate statements (Step 30).

The execution-path intermediate code generating unit 122 judges whether a currently processed replacement target variable is referenced by any statement (Step 31) and contained in the existing variable pairs (Step 32). When both the judgments result in the affirmative (Step 31: YES and Step 32: YES), the execution-path intermediate code generating unit 122 modifies the statement by replacing the identifier of the replacement target variable with the identifier that is paired in a relevant variable pair (Step 33), and then moves onto a step 34. When any of the judgments in the steps 31 and 32 results in the negative (Step 31: NO or Step 32: NO), the processing simply moves onto the step 34.

Next, the execution-path intermediate code generating unit 122 judges whether the currently processed replacement target variable is defined by any statement (Step 34) and contained in the existing variable pairs (Step 35). When both the judgments result in the affirmative (Step 34: YES and Step 35: YES), the execution-path intermediate code generating unit 122 deletes the variable pair that contains the replacement target variable (Step 36), and moves onto a step 37. When it is judged in the step 35 that there is no corresponding variable pair (Step 35: NO), the processing simply moves onto the step 37.

In the step 37, the execution-path intermediate code generating unit 122 determines a variable to be used to replace the replacement target variable that is defined, and replaces the replacement target variable with the thus determined variable, and generates a new variable pair made up of the pre- and post-replacement variables.

Operation Examples

Next, a specific example is given to the operation flow shown in FIG. 2, using the partial source program shown in FIG. 5A. FIGS. 5B and 9-12 are also referenced in the following description. In this example, it is assumed that the intermediate code is relatively close to the source program.

In the step 11, the syntax analyzer 11 syntactically analyzes the partial program and generates partial intermediate code. The thus generated partial intermediate code is stored within the compiler 1.

Next, in the step 12, the program converter 120 receives hot path information that specifies, as a hot path, a path 200 sequentially connecting the basic blocks B1, B2, B4, B5, and B7 shown in the control flow graph (FIG. 5B). Upon receipt, the program converter 120 stores therein the hot path information.

In the step 13, the optimizer 12 carries out the control flow and data flow analyses. Based on the analyses, the variable information computing unit 121 computes liveness information IN and OUT and definition information DEF (FIG. 10A) for each of the basic blocks B1-B7 of the control flow graph (FIG. 5B). Specifically, the liveness information IN for the basic block B1 (FIG. 5B) indicates the variables that are shown in FIG. 10A in the "IN" column 302 at the row "B1". The liveness information OUT for the basic block B1 indicates the variables that are shown in the "OUT" column 304 at the same row. The definition information DEF for the basic block B1 indicates the variables that are shown in the "DEF" column 303 at the same row.

Next, in the step 14, the variable information computing unit 121 derives the path-entry variables 401, the path-exit variables 402, the replacement target variables 403, and the restoration target variables 404 (FIG. 10B), based on the liveness information and definition information shown in FIG. 10A as well as on the hot path information input in the step 12.

The path-entry variables 401 are alive at the entry point of the hot path. In other words, the path-entry variables are indicated by the liveness information IN for the basic block B1 (FIG. 5B) and thus contained in the IN column 302 at the row "B1" (FIG. 10A).

The path-exit variables 402 are alive at the exit point of the hot path. In other words, the path-exit variables 402 are indicated by the liveness information OUT for the basic block B7 (FIG. 5B) and thus contained in the OUT column 304 at the row "B7" (FIG. 10A).

The replacement target variables 403 are the path-entry variables 401 that are contained in the DEF column 303 (FIG. 10A) for the basic blocks B1, B2, B4, B5, and B7 residing on the hot path 200.

The restoration target variables 404 are included in both the path-exit variables 402 and the replacement target variables 403.

In the example shown in FIG. 10, the DEF column 303 contains the variables {a, c, d, f, x}, whereas the path-entry variables are {b, c, d, e, g, z, w, y}. Consequently, the replacement target variables are {c, d}. In addition, the path-exit variables are {a, c, e, f, z, w, x, y}. Consequently, there is one restoration target variable, which is {c}.

The variable information computing unit 121 sends the replacement target variables to the execution-path intermediate code generating unit 122 and the restoration target variable to the restoration intermediate code generating unit 124.

In the next step of S15, the execution-path intermediate code generating unit 122 reads the partial intermediate code and the hot path information, duplicates the statements S1-S15 residing on the hot path 200 shown in FIG. 5, and generates new basic blocks B12-B72 with the duplicate statements. The execution-path intermediate code generating unit 122 then performs the variable replacement processing to replace the replacement target variables that are included in the duplicate statements and generates variable pairs. FIG. 9 shows the execution path that is newly generated by conducting the variable replacement processing on the duplicate statements.

Now, a description is given to the variable replacement processing (FIG. 4) taking the basic blocks B12 and B22 shown in FIG. 9, as an example.

Before the variable replacement processing, the duplicate statements included in the basic block B12 are identical to the statements included in the basic block B1 shown in FIG. 5B. The duplicate statement S12 in the basic block B12 has a reference to the variable "c", which is the replacement target variable (FIG. 4, Step 31: YES). Yet, there is no variable pair containing the variable "c" (FIG. 4, Step 32: NO), so that the execution-path intermediate code generating unit 122 does not replace the variable "c". In addition, the statement S12 does not define any replacement target variables (FIG. 4, Step 34: NO). Thus, the duplicate statement S22 is to be processed next. The execution-path intermediate code generating unit 122 judges that the duplicate statement S22 before the variable replacement processing defines the replacement target variable "c" (FIG. 4, Step 34: YES) and that there is no variable pair made up of the variable "c" (FIG. 4, Step 35: NO). Consequently, the execution-path intermediate code generating unit 122 modifies the statement S22 by replacing the identifier of variable "c" with "t1" which is contained neither in the variable table nor in the variable pairs and generates a new variable pair (c, t1) (FIG. 4, Step 37). The statement S32 to be processed next does not have any reference to a replacement target variable and does not define any replacement target variables. Thus, no variable replacement takes place. Next, the statement S42 included in the next basic block B22 is to be processed. (Note that the variable pairs having been generated through the variable replacement processing conducted on the basic block B12 are shown in FIG. 10C in a "variable pair generation history" column 502 at the row "B12".)

Subsequently, it is judged that the statement S42 before the variable replacement processing has a reference to the variable "c" (FIG. 4, step 31: YES) and that the variable pair (c, t1) is already present as shown in FIG. 10C in the column 502 at the "B12" row (FIG. 4, Step 32: YES). Thus, the execution-path intermediate code generating unit 122 modifies the statement S42 by replacing the variable "c" with "t1" (FIG. 4, Step 33). Next, it is judged that the statement S42 defines the replacement target variable "c" (FIG. 4, Step 34: YES) and that the variable pair (c, t1) is already present (FIG. 4, Step 35: YES). Thus, the execution-path intermediate code generating unit 122 deletes the variable pair (c, t1) (FIG. 4, Step 36), modifies the statement S42 by replacing the identifier of variable "c" with "t2", which is included neither in the variable table nor in the variable pairs, and generates a new variable pair (c, t2) (FIG. 4, Step 37).

FIG. 10C shows the variable pair generation history 500 having been stored through the variable replacement processing repeated by the execution-path intermediate code generating unit 122 for each statement up to S152 of the basic block B72.

The execution-path intermediate code generating unit 122 sends, to the restoration intermediate code generating unit 124, the variable pairs (c, t2) and (d, t3) shown in FIG. 10C at the row of which block 501 column indicates "B72". In addition, the execution-path intermediate code generating unit 122 sends the statements S12-S152 composing the execution-path intermediate code shown in FIG. 9 to the judgment intermediate code generating unit 123.

Next, in the step 16, the judgment intermediate code generating unit 123 converts the branch conditions S32 and S92 included in the received statements into a statement S201 of branch intermediate code (shown in FIG. 11 in a basic block B104) that includes a branch condition for executing the hot path. The judgment intermediate code generating unit 123 then generates the basic block B104 that includes the statement S201 and stores the resulting basic block B104 within the program converter 120.

Next, in the step 17, the restoration intermediate code generating unit 124 generates a statement S301 of restoration intermediate code for restoring the variable "t2" to "c", based on the restoration target variable {c} and the variable pair (c, t2) sent from the variable information computing unit 121. The restoration intermediate code generating unit 124 then generates the basic block B103 (FIG. 11) with the statement S301 of the restoration intermediate code.

Figure 11:
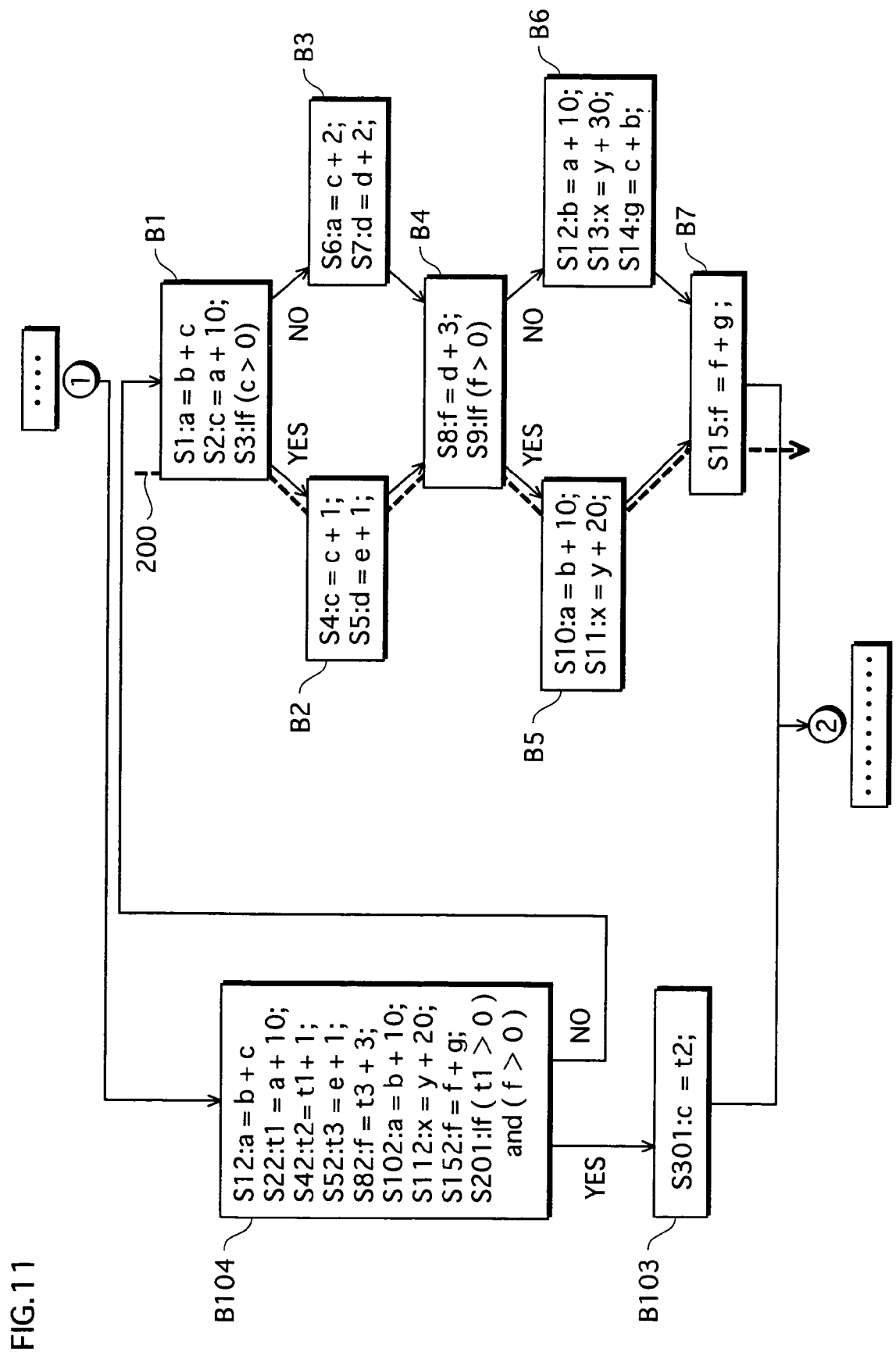
FIG. 11 is a control flow graph of a program converted by the program converter 120.

In the step 18, the branch intermediate code generating unit 125 reads the basic block B104 shown in FIG. 11 and generates branch intermediate code. The branch intermediate code generated herein causes the statement S301 in the basic block B103 to be executed if the judgment in the statement S201 is true, and causes the series of statements starting from the statement S1 in the basic block B1 to be executed if the judgment is false. The branch intermediate code generating unit 125 then inserts the branch intermediate code into the execution-path intermediate code.

In the step 19, the optimizer 12 optimizes the intermediate code generated through the processing up to the step 18 to improve the execution speed.

Figure 12:
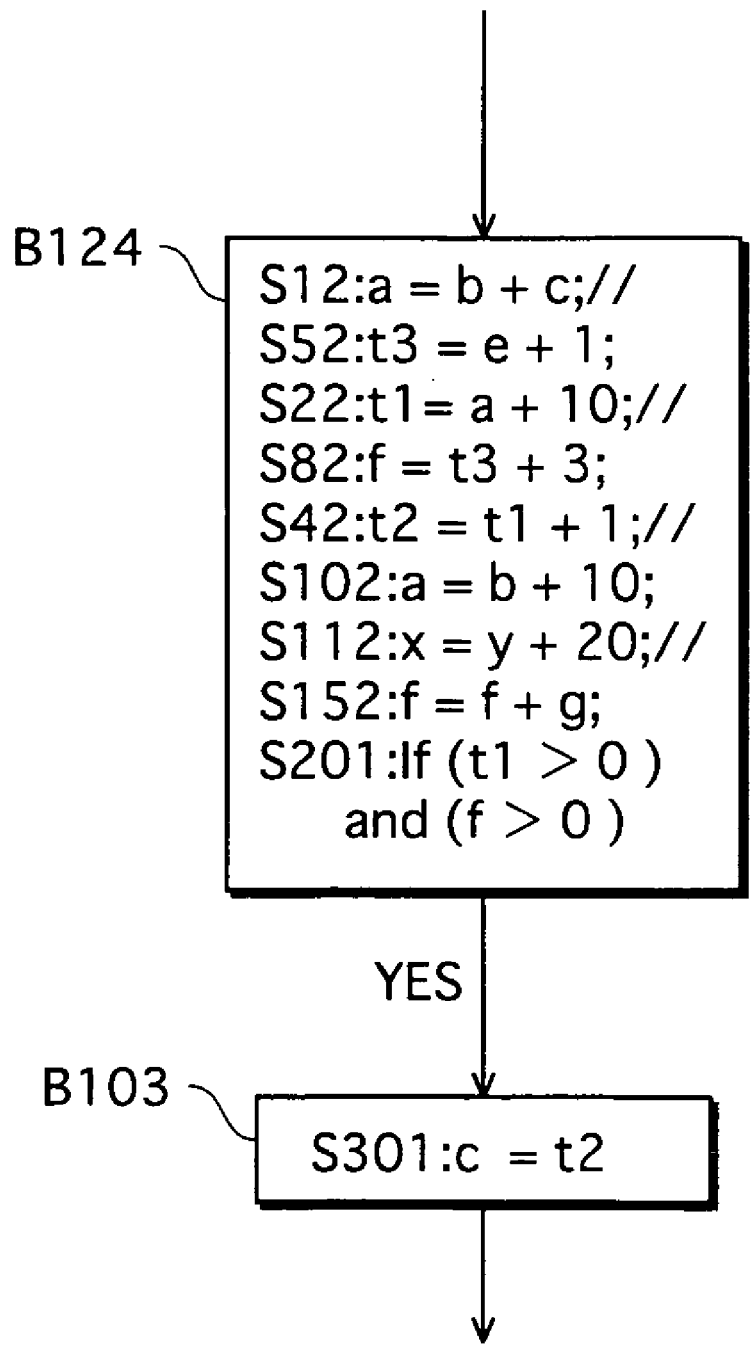
FIG. 12 shows execution-path intermediate code after instruction scheduling by an optimizer 12.

FIG. 12 shows the basic block B124 generated by conducting instruction scheduling on the statements of the basic block B104. Note that the notation "//" in the figure represents that statements preceding and subsequent to the notation are processed in parallel.

Modification 1

According to the above embodiment, the judgment intermediate code generating unit 123 generates the branch instruction S201 that includes a branch condition for executing the hot path, by connecting the branch conditions S32 and S92 shown in FIG. 9 using logical AND. Yet, as in a statement S202 shown in FIG. 13, it is applicable to invert the branch conditions S32 and S92.

Figure 13:
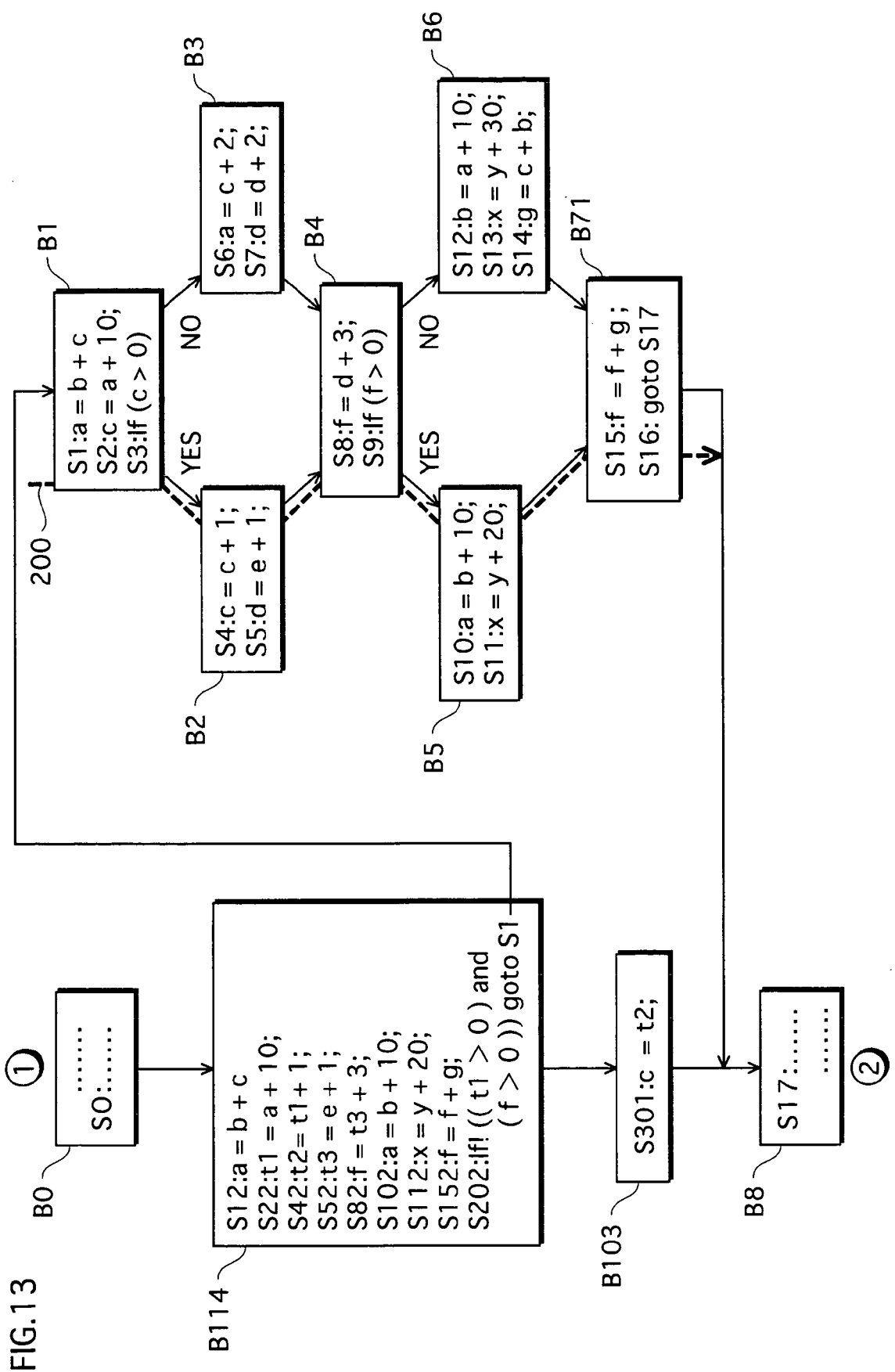
FIG. 13 is a control flow graph according to a modification 1 of the present invention.

In addition, it is applicable to make an arrangement as shown in FIG. 13, so that the partial program is executed as a subroutine and a path connecting newly generated basic blocks B114 and B103 is taken as a main execution path. For this purpose, the basic block B114 is placed at a position immediately after the statement S0 which is the last statement in the basic block B0 immediately preceding the partial program. In addition, the basic block B103 is placed at a position immediately before the statement S17 which is the first statement in the basic block B8 immediately following the partial program.

Hereinafter, with reference to FIG. 2, a description is given to processing to make the above arrangement.

Note that the intermediate code representing the statements placed before and after the partial program is stored in the program converter 120 in advance.

In the step 15, the execution-path intermediate code generating unit 122 duplicates the statements S1-S15 residing on the hot path 200 and carries out the variable replacement processing on the duplicate statements to generate the statements S12-S152 (FIG. 9) composing the execution-path intermediate code.

The execution-path intermediate code generating unit 122 inserts the statements S12-S152 (FIG. 9) at a position immediately after the statement S0 and stores the resulting intermediate code into the program converter 120. In addition, the execution-path intermediate code generating unit 122 sends the statements S12-S152 to the judgment intermediate code generating unit 123.

In the step 16, the judgment intermediate code generating unit 123 inverses the branch conditions of the branch conditions S32 and S92 included in the received statements, and connects the inversed branch conditions to generate the judgment intermediate code. The judgment intermediate code generating unit 123 then stores the basic block B114 composed of the statements S12-S152 stored within the program converter 120 and the thus generated judgment intermediate code.

Next, in the step 17, the restoration intermediate code generating unit 124 generates the basic block B103 that includes the statement S301 of the restoration intermediate code. In addition, the restoration intermediate code generating unit 124 places the basic block B103 at a position immediately after the basic block B114 stored in the program converter 120, and places a series of statements starting from the statement S17 at a position immediately after the basic block B103.

In the step 18, the branch intermediate code generating unit 125 reads the basic block B114 and generates branch intermediate code that causes a branch to the statement S1 in the basic block B1 if the branch condition of the judgment intermediate code is met. The thus generated branch intermediate code is inserted into the judgment intermediate code, whereby the statement S202 is generated. The branch intermediate code generating unit 125 then generates the basic block B114 that includes the statement S202, and stores the basic block B114 within the program converter 120.

In addition, the branch intermediate code generating unit 125 generates the statement S16 of branch intermediate code that causes a branch from the statement S15 to the statement S17. The branch intermediate code generating unit 125 then inserts the statement S16 at a position immediately following the statement S15, and stores the resulting intermediate code within the program converter 120.

As described above, the statements are reordered, so that the partial program is executed as a subroutine and that the execution-path code and the source program code except the partial program are taken as a main path. This arrangement eliminates a branch instruction causing a branch from the end of execution-path code to the source program. In the case where the execution-path code is expected to be executed with a high frequency, memory allocation is effectively carried out, so that the execution speed of the overall main path is improved.

Modification 2

Figure 14:
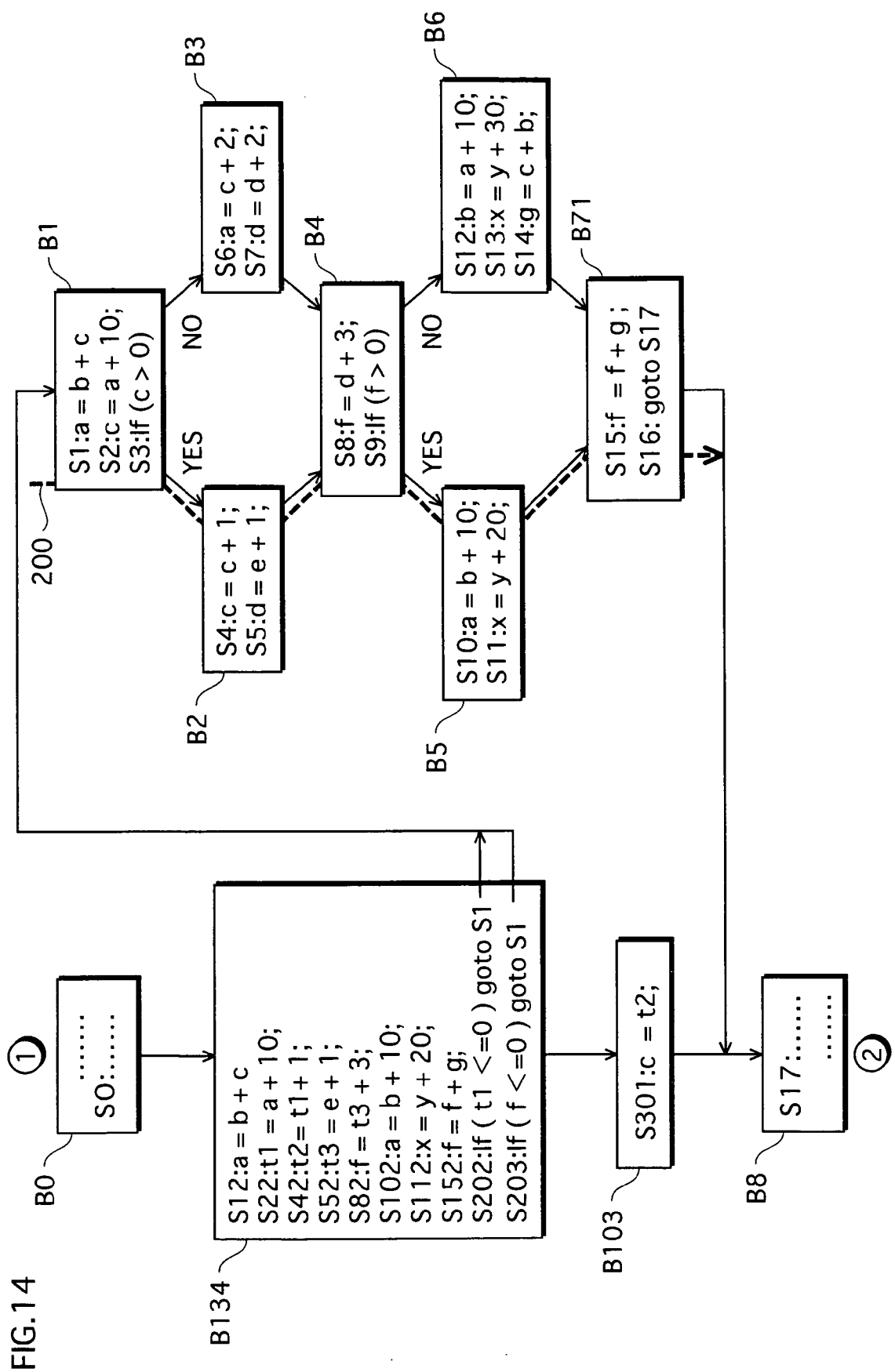
FIG. 14 is a control flow graph according to a modification 2 of the present invention.

In the modification 1 described above, the judgment intermediate code generating unit 123 generates the statement S202 by connecting the branch conditions S3 and S9. Yet, it is also applicable to convert the branch instructions into separate sets of judgment intermediate code as the branch conditions S202 and S203 shown in FIG. 14.

In this case, in the step 16, the judgment intermediate code generating unit 123 inverses the branch conditions of the branch conditions S32 and S92, converts the inverted statements into separate sets of judgment intermediate code.

In the step 18, the branch intermediate code generating unit 125 generates separate sets of branch intermediate code each causing a branch to the statement S1 at the top of the basic block B1 when the respective branch condition of each set of judgment intermediate code corresponding to respective one of the statements S32 and S92 is true. The branch intermediate code generating unit 125 then inserts the sets of branch intermediate code into the respective sets of judgment intermediate code to generate statements S202 and S203. Finally, the branch intermediate code generating unit 125 generates a basic block B134 and stores the basic block B134 within the program converter 120.

Figure 15:
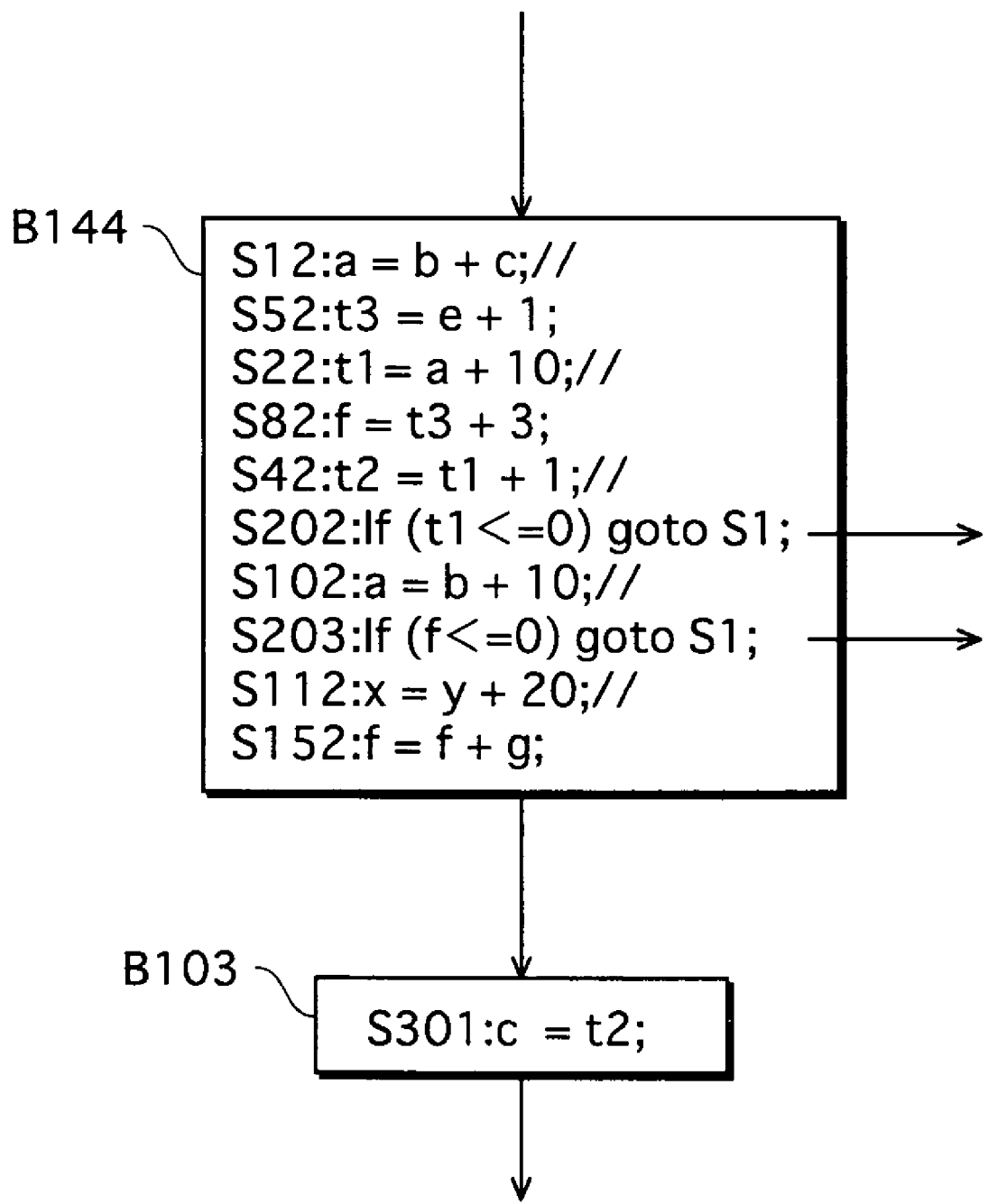
FIG. 15 shows execution-path intermediate code after instruction scheduling by the optimizer 12 according to the modification 2.

FIG. 15 shows the example of the intermediate code of which statements in the basic block B144 have been optimized in the step 19 by the optimizer 12 using the instruction scheduling.

As shown in FIG. 15, the judgment intermediate code and branch intermediate code are generated separately for each branch conditions. Thus, a judgment as to whether the hot path is taken is made earlier. This arrangement causes another path to be taken earlier when the hot path is not taken. This arrangement is especially effective when the hot path is not expected to be taken very frequently.

Supplemental Note

Up to this point, a compiler according to the present invention has been described by way of the embodiment and modifications. It should be naturally appreciated, however, that the present invention is not limited to the above specific embodiment and modifications.

(1) According to the above embodiment, the program converter 120 carries out the variable replacement processing by first duplicating the statements of the intermediate code corresponding to the hot path and then replacing the replacement target variables included in the duplicate statements. Yet, the variable replacement processing may be carried out by sequentially referencing the statements and generates execution-path intermediate code, without involving duplication of the statements.

(2) According to the variable replacement processing in the above embodiment, when a replacement target variable is defined, the variable at the variable definition point is replaced, and a variable pair is replaced for each variable replaced. In addition, when a replacement target variable is referenced, the variable at the variable definition point is replaced with an identifier as shown in a corresponding variable pair. Yet, it is also applicable to replace a replacement target variable at the variable definition point and the variable reference point all with the same identifier.

(3) According to the above embodiment, the hot path information is input by a user to the program converter 120. However, there is an alternative in the case where the compiler has an interpreter function of sequentially interpreting and executing a program or where the compiler operates in conjunction with a device capable of executing a program such as a debugger. In such a case, it is applicable to sequentially execute the source program and dynamically store information relating to execution paths having been taken in memory or other storage. The program converter 120 uses the stored information to extract frequently taken execution paths.

(4) According to the above embodiment, the program converter 120 generates an executable program by converting intermediate program that has been converted by the syntax analyzer 11 and subjected to the variable replacement processing. However, it is also applicable to conduct the variable replacement processing on the source program statements residing on the hot path, and then converts the resulting source program into an executable program.

(5) The present invention may be embodied as computer programs executed by a computer to carry out the various processing described above. Further, the present invention may be embodied as digital signals representing the computer programs. The present invention may be embodied as a computer-readable recording medium storing any of the programs and digital signals. The computer-readable recording medium may be a flexible disk, a hard disk, a CD-ROM, an MO disc, a DVD, or a semiconductor memory. Alternatively, the present invention may be embodied as any of the computer programs and digital signals transmitted via a network, such as an electronic communications network, a wired or wireless communications network, or the Internet.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A compiler apparatus including a microprocessor for converting a source program including a branch instruction into an object program composed of lines of object code, the apparatus comprising:

an execution path specifying unit configured to specify one of a plurality of execution paths of a partial series of instructions, including a branch instruction, of the source program;

an execution-path code generating unit configured to generate execution-path code that is object code corresponding to instructions residing on the specified execution path except the branch instruction, with replacing each specific variable residing on the specified execution path with another variable which does not reside on the specified execution path, wherein the specific variable is a variable that needs to be alive at an entry point of the specified execution path and is defined on the specified execution path;

a restoration code generating unit configured to generate restoration code for restoring each of the replaced variables that needs to be alive at an exit point of the specified execution path to an original variable;

a partial code generating unit configured to generate partial code corresponding to the partial series of instructions;

a branch code generating unit configured to generate branch code based on a branch condition of the branch instruction residing on the specified execution path; and an optimizer configured to optimize the execution-path code to improve execution speed, wherein the branch code leads from an end of the execution-path code to a beginning of the restoration code if the branch condition is true, and leads from the end of the execution-path code to a beginning of the partial code if the branch condition is false so that the partial code including branch instruction is executed after end of execution of the execution-path code.

2. The compiler apparatus according to claim 1, wherein:

the execution-path code generating unit is further configured to place the execution-path code at a position immediately after a series of instructions immediately preceding a beginning of the partial series of instructions, the restoration code generating unit is further configured to place the restoration code at a position immediately after the end of the execution-path code and to place, at a position immediately after the restoration code, a series of instructions immediately following an end of the partial series of instructions, and the branch code generating unit is further configured to generate branch code that causes a branch from an end of the partial code to the series of instruction immediately following the end of the partial series of instructions.

3. The compiler apparatus according to claim 2, wherein:
the compiler apparatus converts the source program into intermediate code based on a syntactic analysis, and converts the intermediate code into the object program,
the execution-path code generating unit includes:
a variable information deriving subunit operable configured to derive a target variable to be replaced, from variables included in partial intermediate code that is converted from the partial series of instructions based on the syntactic analysis;
an execution-path intermediate code generating subunit configured to generate execution-path intermediate code at least including intermediate code that is included in the partial intermediate code and corresponds to the instructions residing on the specified execution path except the branch instruction, by replacing each target variable included in the intermediate code with another variable; and
a judgment intermediate code generating subunit configured to convert all branch condition included in the execution-path intermediate code into a single branch condition for taking the specified execution path and to generate judgment intermediate code for making a judgment on the branch condition,
the restoration code generating unit includes:
a restoration intermediate code generating subunit configured to generate restoration intermediate code for restoring each replaced variable that needs to be alive at the exit point of the specified execution path to an original variable, and
the branch code generating unit includes:
a branch intermediate code generating subunit configured to generate branch intermediate code that causes a branch to a beginning of the partial intermediate code if the branch condition in the judgment intermediate code is false; and
an executable code generating subunit configured to convert the partial intermediate code, the execution-path intermediate code, the judgment intermediate code, the restoration intermediate code, and the branch intermediate code to executable code that constitutes the object program.

4. The compiler apparatus according to claim 2, wherein:
the compiler apparatus converts the source program into intermediate code based on a syntactic analysis, and converts the intermediate code into the object program,
the execution-path code generating unit includes:
a variable information deriving subunit configured to derive a target variable to be replaced, from variables included in partial intermediate code that is converted from the partial series of instructions based on the syntactic analysis;
an execution-path intermediate code generating subunit configured to generate execution-path intermediate code at least including intermediate code that is included in the partial intermediate code and corresponds to the instructions residing on the specified execution path except the branch instruction, by replacing each target variable included in the intermediate code with another variable; and
a judgment intermediate code generating subunit configured to separately convert each branch condition included in the execution-path intermediate code into an individual branch condition for taking the specified execution path and to generate separate sets of judgment intermediate code each for making a judgment on a respective one of the branch conditions,
the restoration code generating unit includes:
a restoration intermediate code generating subunit configured to generate restoration intermediate code for restoring each replaced variable that needs to be alive at the exit point of the specified execution path to an original variable, and
the branch code generating unit includes:
a branch intermediate code generating subunit configured to separately generate sets of branch intermediate code each for causing a branch to a beginning of the partial intermediate code if the branch condition in the respective one of the sets of judgment intermediate code is false and leading toward a beginning of the restoration intermediate code if the branch condition is true; and
an executable code generating subunit configured to convert the partial intermediate code, the execution-path intermediate code, the judgment intermediate code, the restoration intermediate code, and the branch intermediate code to executable code that constitutes the object program.

5. The compiler apparatus according to claim 1, wherein:
the compiler apparatus has an interpreter function for sequentially executing the source program,
the compiler apparatus further comprises:
an extracting unit configured to extract a frequently executed path by collecting information on execution paths taken during execution of the partial series of instructions using the interpreter function, and
the execution path specifying unit specifies the execution path extracted by the extracting unit.

6. The compiler apparatus according to claim 1, wherein the compiler apparatus further optimizes object code generated by the partial code generating unit, the restoration code generating unit, and the branch code generating unit.

7. A compilation method for converting a source program containing a branch instruction into an object program composed of lines of object code, the method comprising the steps of:
specifying one of a plurality of execution paths of a partial series of instructions, including a branch instruction, of the source program;
generating execution-path code that is object code corresponding to instructions residing on the specified execution path except the branch instruction, with replacing each specific variable residing on the specified execution path with another variable which does not reside on the specified execution path, wherein the specific variable is a variable that needs to be alive at an entry point of the specified execution path and is defined on the specified execution path;
generating restoration code for restoring each of the replaced variables that needs to be alive at an exit point of the specified execution path to an original variable;
generating partial code corresponding to the partial series of instructions;
generating branch code based on a branch condition of the branch instruction residing on the specified execution path; and
optimizing the execution-path code to improve execution speed, wherein
the branch code leads from an end of the execution-path code to a beginning of the restoration code if the branch condition is true, and leads from the end of the execution-path code to a beginning of the partial code if the branch condition is false so that the partial code including branch instruction is executed after end of execution of the execution-path code.

8. The compilation method according to claim 7, wherein
the execution-path code generating step further involves placing the execution-path code at a position immediately after a series of instructions immediately preceding a beginning of the partial series of instructions, the restoration code generating step further involves placing the restoration code at a position immediately after the end of the execution-path code and placing, at a position immediately after the restoration code, a series of instructions immediately following an end of the partial series of instructions, and the branch code generating step further involves generating branch code for causing a branch from an end of the partial code to the series of instruction immediately following the end of the partial series of instructions.

9. The compilation method according to claim 8, wherein
the compilation method converts the source program into intermediate code based on a syntactic analysis, and converts the intermediate code into the object program, the execution-path code generating step includes the substeps of:
  deriving a target variable to be replaced, from variables included in partial intermediate code that is converted from the partial series of instructions based on the syntactic analysis;
  generating execution-path intermediate code at least including intermediate code that is included in the partial intermediate code and corresponds to the instructions residing on the specified execution path except the branch instruction, by replacing each target variable included in the intermediate code with another variable; and
  converting all branch condition included in the execution-path intermediate code into a single branch condition for taking the specified execution path and generating judgment intermediate code for making a judgment on the branch condition, the restoration code generating step includes the substep of:
  generating restoration intermediate code for restoring each replaced variable that needs to be alive at the exit point of the specified execution path to an original variable, and the branch code generating step includes the substeps of:
  generating branch intermediate code that causes a branch to a beginning of the partial intermediate code if the branch condition in the judgment intermediate code is false; and
  converting the partial intermediate code, the execution-path intermediate code, the judgment intermediate code, the restoration intermediate code, and the branch intermediate code to executable code that constitutes the object program.

10. The compilation method according to claim 8, wherein
the compilation method converts the source program into intermediate code based on a syntactic analysis, and converts the intermediate code into the object program, the execution-path code generating step includes the substeps of:
  deriving a target variable to be replaced, from variables included in partial intermediate code that is converted from the partial series of instructions based on the syntactic analysis;
  generating execution-path intermediate code at least including intermediate code that is included in the partial intermediate code and corresponds to the instructions residing on the specified execution path except the branch instruction, by replacing each target variable included in the intermediate code with another variable; and
  separately converting each branch condition included in the execution-path intermediate code into an individual branch condition for taking the specified execution path and generating separate sets of judgment intermediate code each for making a judgment on a respective one of the branch conditions, the restoration code generating step includes the substep of:
  generating restoration intermediate code for restoring each replaced variable that needs to be alive at the exit point of the specified execution path to an original variable, and the branch code generating step includes the substeps of:
  separately generating sets of branch intermediate code each for causing a branch to a beginning of the partial intermediate code if the branch condition in the respective one of the sets of judgment intermediate code is false and leading toward a beginning of the restoration intermediate code if the branch condition is true; and
  converting the partial intermediate code, the execution-path intermediate code, the judgment intermediate code, the restoration intermediate code, and the branch intermediate code to executable code that constitutes the object program.

11. The compilation method according to claim 7, wherein
the compilation method sequentially executes the source program by interpreting, the compilation method further comprises the substep of:
extracting a frequently executed path by collecting information on execution paths taken during execution of the partial series of instructions using the interpreter function, and the execution path specifying step specifies the execution path extracted in the extracting step.

12. The compilation method according to claim 7, wherein
the compilation method further optimizes object code generated in the partial code generating step, the restoration code generating step, and the branch code generating step.

13. A computer-readable recording medium comprising a compilation program for causing a device including a CPU to convert a source program containing a branch instruction into an object program composed of lines of object code, the compilation program composed of instructions, when executed, to cause the device to perform the steps of:
  specifying one of a plurality of execution paths of a partial series of instructions, including a branch instruction, of the source program;
  generating execution-path code that is object code corresponding to instructions residing on the specified execution path except the branch instruction, with replacing each specific variable residing on the specified execution path with another variable which does not reside on the specified execution path, wherein the specific variable is a variable that needs to be alive at an entry point of the specified execution path and is defined on the specified execution path;
  generating restoration code for restoring each of the replaced variables that needs to be alive at an exit point of the specified execution path to an original variable;
  generating partial code corresponding to the partial series of instructions;

generating branch code based on a branch condition of the branch instruction residing on the specified execution path; and optimizing the execution-path code to improve execution speed, wherein the branch code leads from an end of the execution-path code to a beginning of the restoration code if the branch condition is true, and leads from the end of the execution-path code to a beginning of the partial code if the branch condition is false so that the partial code including branch instruction is executed after end of execution of the execution-path code.

14. The computer-readable recording medium according to claim 13, wherein:

the execution-path code generating step further involves placing the execution-path code at a position immediately after a series of instructions immediately preceding a beginning of the partial series of instructions, the restoration code generating step further involves placing the restoration code at a position immediately after the end of the execution-path code and placing, at a position immediately after the restoration code, a series of instructions immediately following an end of the partial series of instructions, and the branch code generating step further involves generating branch code that causes a branch from an end of the partial code to the series of instruction immediately following the end of the partial series of instructions.

15. The computer-readable recording medium according to claim 14, wherein:

the compilation program further causes the device to convert the source program into intermediate code based on a syntactic analysis, and converts the intermediate code into the object program, the execution-path code generating step includes the substeps of:

deriving a target variable to be replaced, from variables included in partial intermediate code that is converted from the partial series of instructions based on the syntactic analysis;

generating execution-path intermediate code at least including intermediate code that is included in the partial intermediate code and corresponds to the instructions residing on the specified execution path except the branch instruction, by replacing each target variable included in the intermediate code with another variable; and converting all branch condition included in the execution-path intermediate code into a single branch condition for taking the specified execution path and generating judgment intermediate code for making a judgment on the branch condition, the restoration code generating step includes the substep of:

generating restoration intermediate code for restoring each replaced variable that needs to be alive at the exit point of the specified execution path to an original variable, and the branch code generating step includes the substeps of:

generating branch intermediate code that causes a branch to a beginning of the partial intermediate code if the branch condition in the judgment intermediate code is false; and converting the partial intermediate code, the execution-path intermediate code, the judgment intermediate code, the restoration intermediate code, and the branch intermediate code to executable code that constitutes the object program.

16. The computer-readable recording medium according to claim 14, wherein:

the compilation program further causes the device to convert the source program into intermediate code based on a syntactic analysis, and converts the intermediate code into the object program, the execution-path code generating step includes the substeps of:

deriving a target variable to be replaced, from variables included in partial intermediate code that is converted from the partial series of instructions based on the syntactic analysis;

generating execution-path intermediate code at least including intermediate code that is included in the partial intermediate code and corresponds to the instructions residing on the specified execution path except the branch instruction, by replacing each target variable included in the intermediate code with another variable; and separately converting each branch condition included in the execution-path intermediate code into an individual branch condition for taking the specified execution path and generating separate sets of judgment intermediate code each for making a judgment on a respective one of the branch conditions, the restoration code generating step includes the substep of:

generating restoration intermediate code for restoring each replaced variable that needs to be alive at the exit point of the specified execution path to an original variable, and the branch code generating step includes the substeps of:

separately generating sets of branch intermediate code each for causing a branch to a beginning of the partial intermediate code if the branch condition in the respective one of the sets of judgment intermediate code is false and leading toward a beginning of the restoration intermediate code if the branch condition is true; and converting the partial intermediate code, the execution-path intermediate code, the judgment intermediate code, the restoration intermediate code, and the branch intermediate code to executable code that constitutes the object program.

17. The computer-readable recording medium according to claim 13, wherein:

the compilation program further causes the device to sequentially execute the source program by interpreting, the compilation program further causes the device to perform the substep of:

extracting a frequently executed path by collecting information on execution paths taken during execution of the partial series of instructions using the interpreter function, and the execution path specifying step specifies the execution path extracted in the extracting step.

18. The computer-readable recording medium according to claim 13, wherein the compilation program further causes the device to optimize object code generated in the partial code generating step, the restoration code generating step, and the branch code generating step.

* * * * *